US012513259B2

(12) United States Patent
Medeirosman et al.

(10) Patent No.: US 12,513,259 B2
(45) Date of Patent: Dec. 30, 2025

(54) LINKING PHYSICAL ITEMS TO VIRTUAL CONTENT WITH INDICIA ENCODINGS

(71) Applicant: Frozen Moments Inc., Henderson, NV (US)

(72) Inventors: Jessica Medeirosman, Henderson, NV (US); Ryan Medeirosman, Henderson, NV (US)

(73) Assignee: Frozen Moments Inc., Henderson, NV (US)

( * ) Notice: Subject to any disclaimer, the term of this patent is extended or adjusted under 35 U.S.C. 154(b) by 67 days.

(21) Appl. No.: 18/401,934

(22) Filed: Jan. 2, 2024

(65) Prior Publication Data

US 2024/0223718 A1 Jul. 4, 2024

Related U.S. Application Data

(63) Continuation-in-part of application No. PCT/US2023/086448, filed on Dec. 29, 2023.

(60) Provisional application No. 63/478,053, filed on Dec. 30, 2022.

(51) Int. Cl.
*H04N 5/272* (2006.01)
*G06K 15/02* (2006.01)

(52) U.S. Cl.
CPC .......... *H04N 5/272* (2013.01); *G06K 15/021* (2013.01); *G06K 15/1809* (2013.01)

(58) Field of Classification Search
USPC ........................................... 386/280
See application file for complete search history.

(56) References Cited

U.S. PATENT DOCUMENTS

| | | | |
|---|---|---|---|
| 11,616,650 B1* | 3/2023 | Panjwani | H04L 9/3247 |
| | | | 713/168 |
| 11,798,244 B1* | 10/2023 | Witchey | G06T 19/003 |
| 12,204,654 B1* | 1/2025 | Soylemezoglu | G06F 21/64 |
| 12,217,261 B2* | 2/2025 | Copeland | G06Q 20/401 |
| 2018/0043259 A1* | 2/2018 | Wong | A63F 13/5255 |
| 2020/0184547 A1* | 6/2020 | Andon | G06Q 30/0209 |
| 2021/0248338 A1* | 8/2021 | Spivack | G06K 7/10831 |
| 2021/0337284 A1* | 10/2021 | Person | H04N 21/466 |
| 2022/0172278 A1* | 6/2022 | Anzevino | G06Q 30/0643 |
| 2022/0258049 A1* | 8/2022 | Kanani | G06Q 30/0621 |
| 2022/0263786 A1* | 8/2022 | Brown | G06F 21/31 |
| 2022/0270421 A1* | 8/2022 | Carter | B64U 80/25 |
| 2022/0284628 A1* | 9/2022 | Tuxen | G06V 10/74 |
| 2022/0351186 A1* | 11/2022 | Quigley | H04L 63/12 |
| 2022/0351280 A1* | 11/2022 | Cardenas Gasca | |
| | | | G06Q 30/0643 |
| 2022/0393873 A1* | 12/2022 | Holland | G06Q 20/02 |
| 2023/0004627 A1* | 1/2023 | Holland | G06F 21/105 |

(Continued)

OTHER PUBLICATIONS

PCT International Search Report and Written Opinion, PCT Application No. PCT/US2023/086448, Apr. 26, 2024, 15 pages.

*Primary Examiner* — Nigar Chowdhury
(74) *Attorney, Agent, or Firm* — Fenwick & West LLP

(57) ABSTRACT

A physical object is printed with an image that is augmented with an arrangement of visual indicia. Properties of the visual indicia such as size, shape, color, orientation, and size encode an identifier of supplemental virtual content. When the physical object is scanned by a camera of a device, the encoded identifier of supplemental content is extracted from the visual indicia and used to retrieve the supplemental content. The supplemental content is presented by the device.

20 Claims, 13 Drawing Sheets

(56) References Cited

U.S. PATENT DOCUMENTS

| | | | |
|---|---|---|---|
| 2023/0045071 A1* | 2/2023 | Kalaldeh | G06Q 30/018 |
| 2023/0077271 A1* | 3/2023 | Kolchin | G06Q 20/389 |
| 2023/0077278 A1* | 3/2023 | Goncalves | G06Q 30/0631 |
| 2023/0083893 A1* | 3/2023 | Craft | H04L 51/52 707/769 |
| 2023/0111817 A1* | 4/2023 | Craft | G06F 16/245 705/14.16 |
| 2023/0133158 A1* | 5/2023 | Kolchin | G06Q 20/0855 705/39 |
| 2023/0154110 A1* | 5/2023 | Stout | G06T 17/20 345/156 |
| 2023/0162433 A1* | 5/2023 | Shirai | G06T 7/75 345/418 |
| 2023/0173395 A1* | 6/2023 | Cella | G06N 3/0455 463/25 |
| 2023/0176805 A1* | 6/2023 | Dudovitch | A63F 13/847 715/757 |
| 2023/0177775 A1* | 6/2023 | Dudovitch | G06F 3/167 345/633 |
| 2023/0214819 A1* | 7/2023 | Tham | G06Q 50/01 705/64 |
| 2023/0244196 A1* | 8/2023 | Palamadai | B33Y 50/00 700/119 |
| 2023/0359709 A1* | 11/2023 | Nickerson | G06V 20/20 |
| 2023/0419303 A1* | 12/2023 | Araki | G06Q 20/3672 |
| 2024/0112409 A1* | 4/2024 | Cross | G06T 19/003 |
| 2025/0135316 A1* | 5/2025 | Tuxen | B25J 9/1692 |

* cited by examiner

|  |  |  | xxx 201 |  |
|---|---|---|---|---|
|  |  |  |  | xxx 202 |
|  | xxx 203 |  |  |  |
| xxx 204 |  |  |  |  |

LINKING PHYSICAL ITEMS TO VIRTUAL CONTENT WITH INDICIA ENCODINGS

CROSS-REFERENCE TO RELATED APPLICATIONS

This application is a continuation-in-part of International Application No. PCT/US2023/86448, filed Dec. 29, 2023, which claims the benefit of U.S. Provisional Patent Application No. 63/478,053, filed on Dec. 30, 2022, both of which are incorporated by reference.

BACKGROUND

This disclosure relates generally to mapping virtual content to physical items using information encoded in indicia applied to the physical items. Marketing companies have used QR codes to connect users to a website when the code is scanned through their device's camera. Video games have used physical cards to unlock elements in a game. Separately, baseball card companies have created NFTs that are representative of physical baseball cards. These examples are limited in interactivity, visual appeal, and overall value provided to content creators and consumers. Specifically, QR codes take up a significant amount of space on the physical items to which they are applied which cannot be used for providing other information or aesthetic appeal to the viewer.

DETAILED DESCRIPTION

Figure 1:
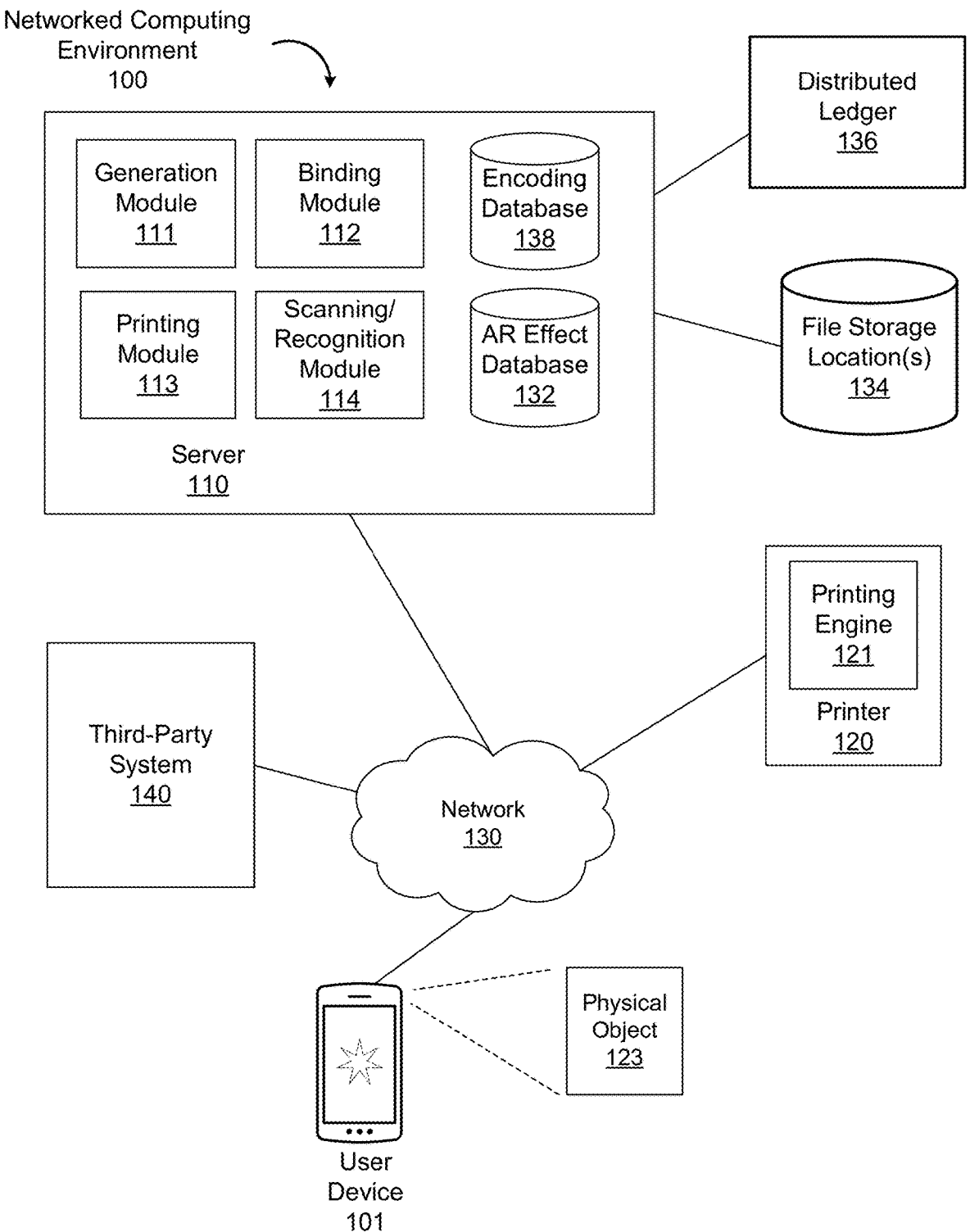
FIG. 1 is a block diagram of a networked computing environment that can provide virtual content in response to scanning of encoded identifiers, in accordance with an embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

OVERVIEW

Described embodiments include methods and systems that identify and connect a physical item such as a holiday card, baseball card, printed artwork, or jpeg style file photo to virtual content that augments the physical item. The virtual content may be hosted at an online media address and include NFT artwork, social media video/soundbites, augmented reality (AR) content, or any other virtual content that may be used to augment the viewer's experience of the physical item. The connection may be made through the camera of a smartphone or other user device, with the camera reading an identifier of the virtual content (e.g., an identifier of a database entry that includes a web address where the virtual content is stored) that is encoded in visual indicia on the physical item. In some embodiments, the physical item includes a photograph or other image. The visual indicia may visually enhance the photograph or other image without diminishing from the artwork. Example visual indicia include emoji placed within the image at certain positions, patterns placed on an image border, filters applied to the image, and the like. In some embodiments, the indicia may be not readily perceived by a human.

In one embodiment, a user may connect physical artwork that is modified through the system to online NFTs or other unique online media using a system that converts an address of the NFT or other online media into a unique code. The unique code is represented by a set of visual indicia that overlaid on a frozen image frame of the online media. The set of visual indicia can be applied as a filter, border, or other overlay on the physical artwork such that when a user points the camera of a smartphone or other web-enabled device at the physical artwork, the NFT or other online media can be accessed by the device decoding its address from the set of visual indicia.

The system may generate unique encodings for each NFT or online media address and register them in a code generating system. This technique can be used by users who want to link or promote their media through a frozen image frame or image on a type of material such as cards, stationary, t-shirts, artwork, or promotional materials. Additionally, other users can send a short video file, audio file, or link to a file that the system converts into a subsequent NFT that is concurrently registered in the code generating system and create associated filters or backgrounds that are tied to the subsequent NFT or online media code.

In one embodiment, a user device displays visual indicia on the frozen image as a graphical representation that uniquely encodes a mapping to virtual content. Example visual indicia include: (1) an image filter displayed over the frozen image frame that would enhance the image frame representing the online media and that can be printed to a device or on a physical object; (2) a border of the frozen image frame that is printed flat or 3D around a frozen image of an NFT that could be perceived similarly to a piece of traditional 2D or 3D art displayed in a gallery; (3) background objects such as watermarks on a physical print of a collectible NFT, such as sports cards or fandom trading cards; or (4) individual characters like emojis that end users selects from that are be distributed around the single image frame in a configuration that is recognized as the unique encoding and mapped to the virtual content.

In another embodiment, a user may either upload a media file that is a specific length (e.g., three or eight seconds) such as a video file, clip from a video game, saved audio file, current dynamic human led generative art, coding art, generative design or use the mobile device to record a quick video, audio recording, or any other media file clipping to be immediately uploaded, recorded, and have associated tracking generated. The user may also initiate the process with a longer media file and then identify which section of the specified length to use for the associated tracking while maintaining the original media file for optional presentation. The user will at that time identify the recording that will be recorded and named within the system with the original date and date for presentation in the case where the clip should not be able to be seen until a specific later date.

In a further embodiment, each graphical representation is converted to a unique code generated by the system through the use of graphical objects converted in a code array along different encoding grids such as 12 bit or 36 bit binary code representations mapped over the horizontal and vertical regions of the printed object, along the image border of the image frame, within a watermarked background, or found in a region along the depth of a 3D frame border.

Binary code may be created upon the conversion of a media file to an NFT or upon the linking of an NFT or online digital media address to the system. The binary code can be hard linked and registered within the system or application along with other demographic and/or ownership validation details, as requested by the end user or as required for the type of media file to confirm originality and authenticity.

In some embodiments, a frozen frame database may use multiple public or licensed databases including, but not limited to, Microsoft SQL database, Snowflake, Google BitQuery, with the unique encoding being translated based on control and variation of filters, frame borders, watermarks, or 3D prints mapped in a translation table to the associated online media. Such online media addresses may be hosted in the application's servers, through a dedicated photo hosting page or social media page through third parties (e.g., Google Photos, Shutterfly, etc.), or connected to a customer's personal social media account, etc.

One or more graphical inputs may be designated as a control within the system, such that upon scanning of an image frame printed onto the physical object, the system recognizes that it is an enhanced image created from the system. This can happen by identifying the outer frame border of the item, the 3D surface of the object, or a combination of graphical micro-images appearing within the image, etc. Once detected, the system can quickly process the frozen image frame against the corresponding types of graphical uniquely coded features, such as the filters, characters, background objects, 3D prints, or some combination thereof.

In one embodiment, a physical item (e.g., printed holiday card) can carry one or more links to virtual content. The system looks for one of a quick set of basic emojis that are the controls along with two others that are each connected to a theme relating to corresponding virtual content. The emojis may be rotated and positioned in one of a set of possible grid locations (e.g., a 14×9 grid), where each grid location, combined with the emoji choice and rotation of the emoji, creates a multitude of permutations that can encode bit characters. The encoded bit carriers can in turn be translated to a location in a data store (e.g., a database table) that holds the online address of the virtual content.

Example Systems

FIG. 1 is a block diagram of one embodiment of a networked computing environment 100 that can provide virtual content in response to scanning of encoded identifiers. In the embodiment shown, the networked computing environment 100 includes a user device 101, a server 110, a printer 120, and a third-party system 140, all connected via a network 130. In other embodiments, the networked computing environment 100 includes different or additional elements. In addition, the functions may be distributed among the elements in a different manner than described.

User device 101 is a computing device enabling user interaction with the server 110 100. In various embodiments, a user device 101 may be a device having computer functionality, such as a personal digital assistant (PDA), a mobile telephone, a smartphone, wearable device (e.g., augmented reality headset), or another suitable device. The user device 101 may include a camera for scanning a physical object 123 and a display for displaying images in the camera view to the user. The user device 101 may include other input and output devices, such as microphones and speakers. In one embodiment, the user device 101 executes an application allowing a user of the user device 101 to interact with the server 110. The user device 101 may interact with the server 110 through an application programming interface (API) running on a native operating system of the user device 101, such as IOS® or ANDROID™.

The server 110 is configured to process instructions for performing a method of augmenting content using printed encodings, including the generation, binding, printing, and recognition of the image and associated unique encoding to provide supplementary virtual content, such as augmented reality content, videos, artwork, music, or the like. The server 110 may coordinate processes involving user device 101 and printer 120, according to instructions stored in memory. The instructions may be stored as module of code, including generation module 111, binding module 112, printing module 113, and scanning/recognition module 114. The server 110 may include or be communicatively coupled to storage locations, which may include one or more databases. The one or more databases may include an encoding database 138 and an augmented reality (AR) effect database 132. The AR effect database 132 stores data for one or more augmented reality effects to be displayed by a user device 101. The encoding database 138 stores a mapping of a unique encoding to a file location (e.g., of file storage location 134), an augmented reality effect (e.g., stored in AR effect database 132), or an NFT (e.g., stored in the distributed ledger 136). In some embodiments, the server 110 may further have access to, or retrieve files from, file storage location(s) 134.

The server 110 may also be configured to perform other operations on the distributed ledger 136. The distributed ledger 136 may be a blockchain, and the server computer 110 may be configured to record interactions to the blockchain, scan and read records of the blockchain, verify signatures, public keys, and certificates on the blockchain, store a local copy of the blockchain, perform other blockchain interactions, or some combination thereof.

The generation module 111 stores instructions for generating unique encodings. Instructions of generation module 111 may include instructions for executing the process 400 of FIG. 4, which is discussed in greater detail below. In embodiments, the instructions may include receiving an image for an augmented reality effect, applying one or more graphical elements to the image, and generating a unique encoding based on the application of the one or more graphical elements to the image. For example, a user may select, upload, or provide the location/address of an image to server computer 110 using a user device 101. The server computer may receive or retrieve the image and may associate it with an augmented reality (AR) effect from AR effect database 132. In one embodiment, the image may be an image frame of a video file. In one embodiment, the AR effect may be generated/created by the user and stored in the AR effect database 132 by the server computer 110. The server computer 110 may provide one or more graphical elements to overlay onto the image.

The graphical elements can include an image border, an image shader, an image filter, one or more emojis, other visual indicia, or some combination thereof. For example, an image border may include a patterned design, such as a series of raised and lowered circular bumps akin to beading on a classical frame or white and black slashes across the edges of a modern frame. In another example, an image shader may include swirling of the visual presentation in specific regions akin to flowing water; bursting oversaturation of color transitioning to grayscale and back; rippling distortion akin to grass waving in the breeze; or the addition of film grain, comic outlining, color banding, artificial backgrounds, and/or scrolling effects. In another example, an image filter may include blended overlay visuals of sports balls, dancers, microphones, emoji, religious symbols, shells, or abstract color that dance across the presentation; a curtain opening and closing; introduction of color-bars and a countdown from old film reels; a cheering crowd; or a standing ovation overlay.

The binding module 112 stores instructions for linking unique encodings to images, with the unique encodings pointing to storage locations where one or more files including virtual content associated with the image are stored. The unique encoding may also identify a time at which the virtual content becomes available to view or a time range during which the virtual content is viewable. Alternatively, the time or time range during which the virtual content is viewable may be stored in conjunction with the virtual content at the location indicated by the unique encoding. Instructions of the binding module 112 may include instructions for performing process 500 of FIG. 5, discussed in greater detail below.

In some embodiments, instructions for linking the unique encoding to the image may include recording a blockchain transaction to distributed ledger 136. In one such embodiment, the system itself is not tied to a single platform for NFTs, but rather can connect to well-established platforms in addition to or instead of using its own that follow the ERC 721 or ERC 1155 protocols. The user provides the system with the current location of their NFT via their crypto address. If a non-curated NFT platform is selected, the media file (e.g., jpg, gif, mov) is uploaded along with details about these cryptocurrency wallets such that a contract as to the ownership of the article can be created. In the case of the system minting the NFT, the system then allows the user to select the wallet they will be using for their NFT and the system mints the NFT token using a contract written in a blockchain currency that the users may select, such as Ethereum, Solana etc. The NFT itself will be directly recorded as the unique personal showpiece for the frozen moment of which additional features are validated against.

The printing module 113 stores instructions for instructing a printer to print the image and the one or more graphical elements as a physical object 123. Instructions of the printing module 113 may include instructions for executing the process 600 of FIG. 6, which is discussed in greater detail below. The instructions may be received by the printer 120 and processed by the printing engine 121 to print the physical object 123 according to the received instructions. The printer 120 is configured to perform prints and execute the printing instructions. The printing instructions may cause the printer to create a physical object that includes image content overlaid with visible indicia, the nature and location of which relative to the image content encode one or more identifiers of virtual content that supplement the physical object 123. The printer 120 may be, for example, an ink-jet printer, a 3-D printer, a carver, a lathe, a loom, a painter, or some combination thereof. The physical object 123 may be one or more of a playing card, a holiday card, a limited-edition trading card, a greeting card, a canvas print, a postcard, a lottery scratcher, a notebook cover, a promotional flyer, a frame, or a piece of art, etc.

The scanning/recognition module 114 stores instructions for recognizing the unique encoding in an image scanned by user device 101. Instructions of the scanning/recognition module 115 may include instructions for executing the process 700 of FIG. 7, which is discussed in greater detail below. In some embodiments, recognizing the unique encoding on the physical object 123 in a camera view modifies a display of the user device 101 to display the corresponding virtual content. The server 110 may look up the storage location of one or more media files associated with the unique encoding and execute playback of the media files by the user device 101. For example, an AR effect can be displayed in conjunction with the physical object on a display of the user device 101, or the user device 101 can display an image, play a movie clip, or play an audio clip, etc.

In one embodiment, the scanned image may be an image frame of a video file, and the augmented reality effect may comprise playing back the entirety of the video file, or some portion thereof. For example, playback of the video file may be executed in a window fixed to the placement of the image frame on the physical object (e.g., within the borders or fixed frame of the card) and may appear to bring a still frame image (i.e., frozen frame) to life. In other embodiments, an augmented reality effect may include such effects as a baseball being hit out of the physical object and into surrounding physical space, a disco ball and light show overtaking the surrounding environment, a three dimensional hologram of a person in the media, a rain storm, or a scene/environment replacing the room around the physical object.

The third-party system 140 includes one or more computing devices that, in some embodiments, can perform some of the steps of generating the physical object 123 that has visual indicia that encode an identifier of virtual content. For example, the server 110 may generate a set of encodings and provide them to the third-party system 140, which binds those encodings to content managed by the third party. As another example, the third-party server 140 may provide a frozen image and corresponding virtual content, and the server 110 may add visual indicia to the frozen image that encode an identifier if the corresponding virtual content.

In one embodiment, a third party may request one or more augmentations (e.g., a frame) to include with its digital content. The third party may provide the intended content at initial creation or it may receive a token and encoding pair which can then be bound to digital content (including NFTs, videos, and holographic recordings, etc.) by referencing the token later. The time at which the moment occurred and a future unlock time for the moment can also be bound to the digital content as described previously. The augmentation image may be provided as a transparent graphic (e.g. a PNG or SVG file) which the third party can apply to a digital or printed image. The combined image and augmentation can then be provided to users to enable the user to access any video, holographic, or other supplemental virtual content that the third party intends to reference/display when a user scans the augmented image. When the user uses the application to scan the augmented image, the user can be presented with the intended video, audio, or holographic content. If the virtual content is not yet available (e.g., because the virtual content is stored with an indication of a time in the future at which the virtual content becomes available) then the user may instead be presented with a countdown or other indication of when the virtual content will unlock. For example, physical objects 123 (e.g., event-specific cards or poker chips, etc.) may be created in advance of an event (e.g., a concert of sporting event) that include visual indicia that encode an identifier of audio, video, or holographic recording that will be generated of the event and made available a certain amount of time after the conclusion of the event (to allow it to be reviewed, edited, and uploaded, etc.). If the user scans the physical object 123 before the time at which the recording is made available, a countdown to that time may be displayed, while a user scanning the physical object 123 after the specified time will be presented with the recording.

Various examples of the server 110 interacting with a third-party system 140 to provide functionality are described in greater detail below, with reference to FIGS. 8 and 9.

The various elements of the networked computing environment 100 are configured to communicate via the network 130, which may include any combination of local area and/or wide area networks, using both wired and/or wireless communication systems. In one embodiment, the network 130 uses standard communications technologies and/or protocols. For example, the network 130 may include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, some or all of the communication links of the network 130 may be encrypted using any suitable technique or techniques.

Example Encodings

Figures 2A, 2B:
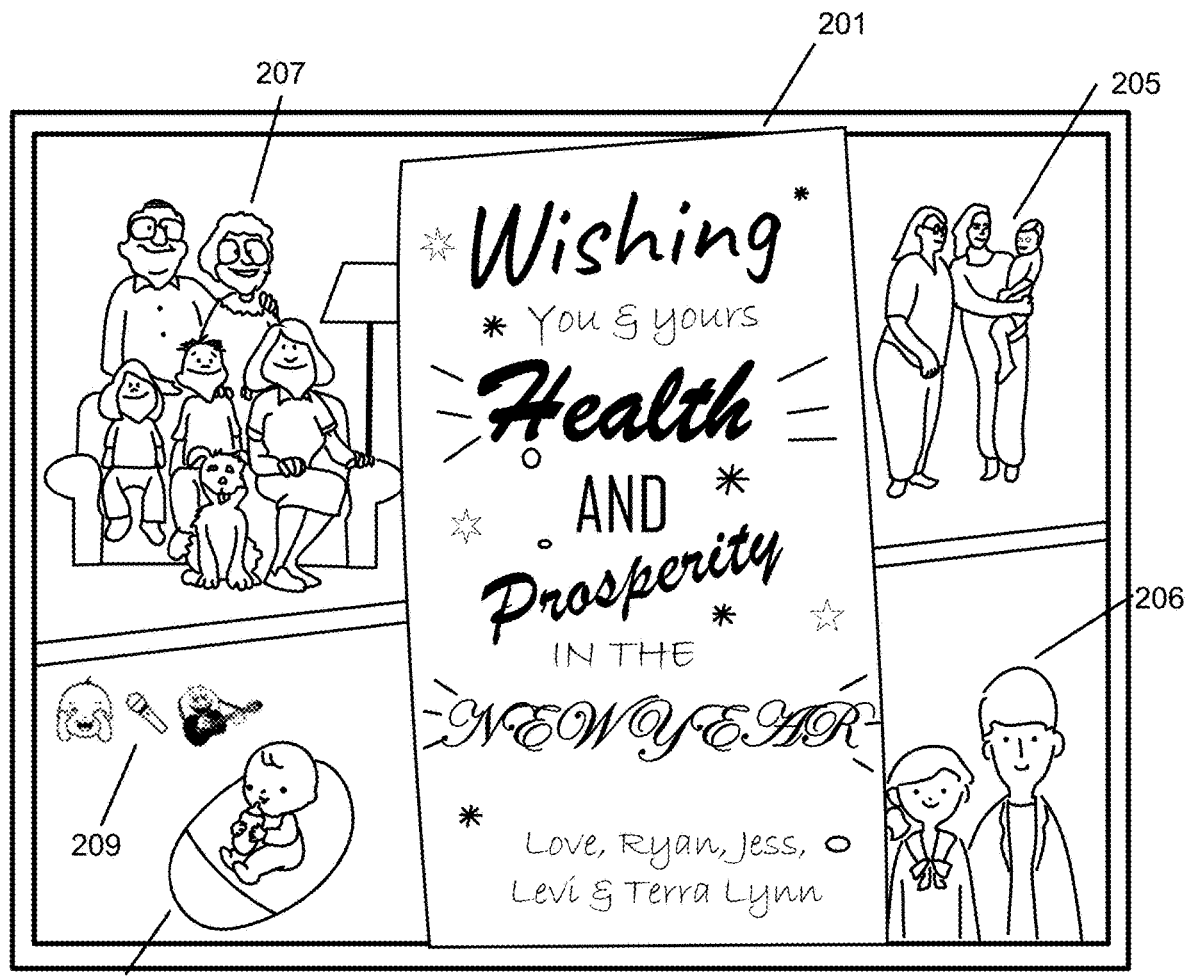
FIG. 2A is an illustration of an encoding grid, in accordance with an embodiment.
FIG. 2B is an illustration of a printed object encoded with a reference to virtual content, in accordance with an embodiment.

FIG. 2A illustrates how the position of visual indicia in a grid overlaid on an image can encode an identifier of virtual content. Typically, the grid is not used in the image and is projected onto the image both when determining where to place the visual indicia and when analyzing the image to identify and decode the visual indicia. However, in some embodiments, an indicator of the alignment of the grid (e.g., small check marks around the periphery of the image) may be used to aid in accurate analysis. The grid shown is a five by four grid having twenty cells in total, but any size of grid may be used with larger numbers of cells providing greater numbers of encodings that are possible (at the expense of requiring increasingly more accurate analysis as the cells become smaller).

When analyzing the image, each cell can be analyzed by a machine-vision algorithm that determines whether any visual indicia are present. If so, the detected visual indicia can be analyzed to extract one or more properties, such as shape, color, size, orientation (i.e., angle of rotation), etc. The extracted properties form a unique encoding that can be mapped to an identifier of virtual content (e.g., an identifier of a cell in a database that includes a URL at which the virtual content is stored). In the example shown in FIG. 2A, four of the cells include visual indicia. A first set of visual indicia 201 are in the fourth column of the top row, a second set of visual indicia 202 are in the fifth column of the second row, a third set of visual indicia 203 are in the second column of the third row, and a fourth set of visual indicia 204 are in the first column of the fourth row.

The visual indicia are denoted as XXX indicating that a wide range of symbols and shapes may be used. In one embodiment, each X represents an emoji with each set being defined in a thematic grouping. A user device 101 can recognize the groupings of emojis as a graphical encoding of binary code that defines the binary space of the system. When an encoding is being created the location of each emoji can be recorded into the master database along with the associated URL or wallet address of the NFT asset or other related media to be linked to the image. The existence or lack thereof of a set of emojis within that part of the grid space along with the particular emojis selected allows the system to register the photo as binary code which can be connected to a look up system. The pre-loaded set of emojis might be, for example, a guitar, a microphone and a keyboard or a tree, the globe, and waves, i.e. some grouping of three seemingly congruent graphical elements based on the thematic themes defined in the database. Each theme is translated to a set of three graphical elements in specific yet seeming random orders, such that they are connected to a set of binary code when crossed against the location in the grid. In some embodiments, two locations in the grid are used for redundancy factors to account for printing inconsistencies. For example, so sets of visual indicia 201 and 202 might be two pre-set sets of three emojis that are congruent to the thematic theme identified by the user when uploading their media clip to the system or connecting their pre-published NFT wallet address etc. and sets of visual indicia 203 and 204 might be backup duplicates of visual indicia sets 201 and 202.

FIG. 2B is an illustration of a printed object that includes visual indicia, in accordance with an embodiment. Illustrated is a physical object embodied as a holiday card. Graphical objects 205, 206, 207, and 208 are applied to an underlying image according to grid positions 201, 202, 203, and 204 respectively. In this version of the holiday card, there is essentially a large very large grid that overlaps for individual photographs. In this case the large grid maps out to the four sets of positioning within the system and the bottom left picture, in grid position 208, has a set of themed emoji 209. The top right picture, in grid position 205, also has a set of themed emoji 210. Although the two sets of emoji 209 and 210 are shown as being the same, in practice, each set of emoji is likely to be different.

In this embodiment, it is easy to determine the position of the sets of emoji 209 and 210 relative to the underlying image content (i.e., which grid cell the sets of emoji 209 and 210 are positioned within) given the size of the cells. The combination of the locations and the specific emoji used is translatable to a set of binary code in the binary set such that it maps within the system to a URL, NFT wallet, or other location of virtual content. Thus, pointing the camera of a user device 101 can directly connect the frozen image frame to an associated online media clip or augmented images that are defined within the system.

Figure 2E:
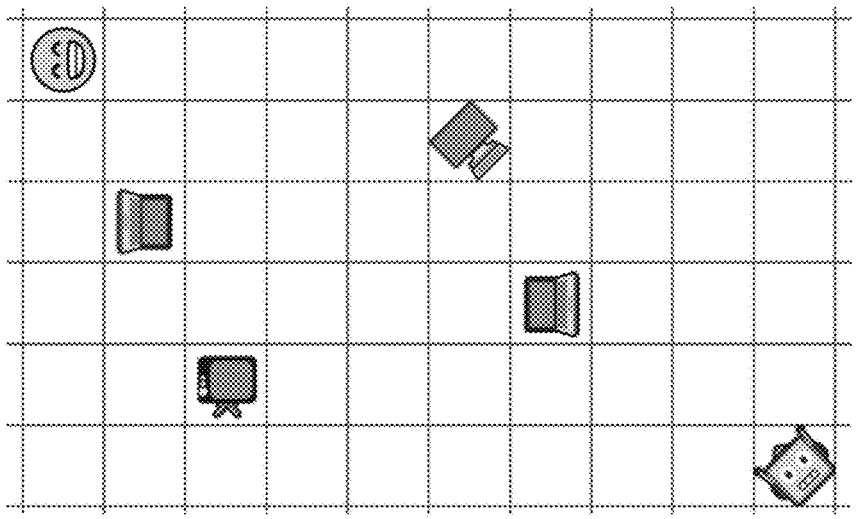
FIGS. 2C-E illustrate example encodings using the selection, position, and orientation of emoji relative to image content, in accordance with an embodiment.
Figure 2D:
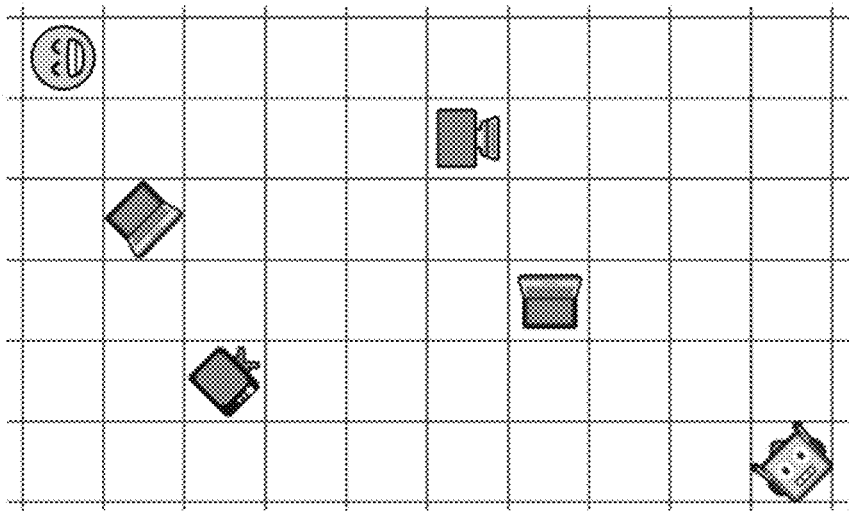
Figure 2C:
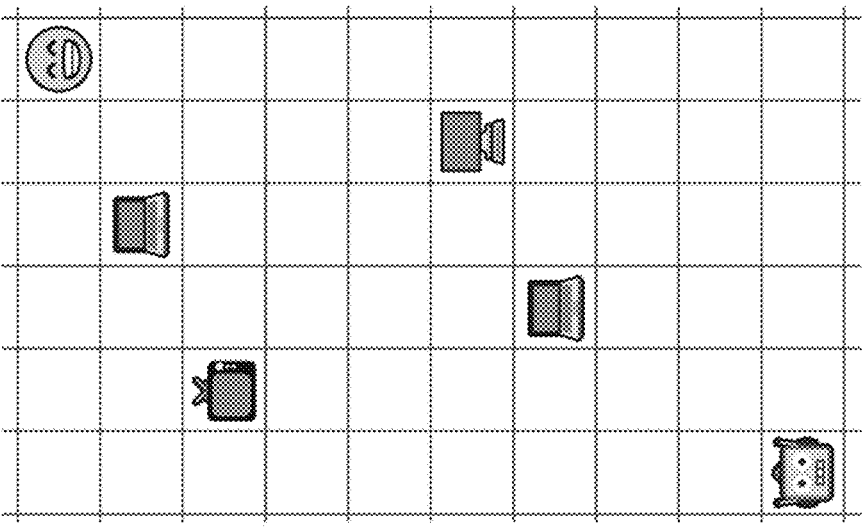

FIGS. 2C-E illustrate example encodings using the selection, position, and orientation of emoji relative to image content. In this example embodiment, a six by ten grid is overlaid on the underlying image providing sixty possible locations for sets of one or more emoji. In FIG. 2C, emoji are placed at six locations within the grid with no rotation being used. FIG. 2D illustrates the same set of emoji with the same locations but a first set of rotations while FIG. 2E illustrates this set of emoji and positions with a second set of rotations. In one embodiment, each emoji may be rotated into eight possible orientations, each 45 degrees apart. During analysis, the rotation of each emoji may be determined relative to the edges of the image, the other emoji in overlaid on the image, or a combination of both. It can easily be appreciated that the combination of eight possible rotations and sixty possible positions for an emoji yields a massive number of possible combinations, even if the selection of types of emoji used is relatively small (e.g., using only a small number of emoji that are easy to distinguish from each other automatically using machine vision).

In one embodiment, each symbol (e.g., emoji) can be stored with its position in the grid and rotation together with the other symbols (and corresponding position and orientation data) included in each encoding. The combination of all symbols, positions, and rotations in the encoding makes for a unique set. This set can be stored in a database. For efficient lookup, each potential symbol in every possible position and rotation may be represented as an entry in a master table with unique keys. A particular encoding is then represented as a combination (e.g., concatenation) of those keys. An example extract of such a master table (with many entries omitted) is shown below:

| Symbol | Position | Rotation | Key |
| --- | --- | --- | --- |
| smiley | <5, 9> | 0 | 51e18806 |
| laptop | <3, 8> | 0 | 0937801f |
| laptop | <3, 8> | 45 | f63fac22 |
| laptop | <3, 8> | 180 | 5b3c7a0e |
| television | <1, 7> | 0 | 2724e084 |
| television | <1, 7> | 135 | 5c5fafc9 |
| television | <1, 7> | 270 | B98d1a23 |

Using this master table, the encoding shown in FIG. 2C would be represented by the set {51e18806, f63fac22, 5c5fafc9 . . . } while the encoding shown in FIG. 2D would be represented by the set {51e18806, 5b3c7a0e, B98d1a23 . . . }, etc.

Alternatively, each space on the grid can have a unique position within a full binary encoding with each symbol available to an encoding being represented by a single binary code and each rotation represented by another. For example, the position <0,0> might start at bit 0, the position <1,0> might start at bit 8, the position <2,0> at bit 16 . . . , and the position <1,0> at bit 48, etc. Using the six by ten grid shown in FIGS. 2C-E, each encoding would thus be represented by a 480-bit code. As an example of how this would encode, if the laptop symbol is represented by 1001 with no rotation being represented by 000 and 270 degree rotation being represented by 110, the laptop at position <2,3> would be represented starting at bit 120 by 1001110 in FIG. 2C (with no rotation) and by 1001000 in FIG. 2D (with 270 degree rotation). Thus, each encoding has a unique binary code. In this case, the encoding of position and orientation only uses seven of the eight bits available for the position. The remaining bit (or bits if fewer than seven bits are used for encoding the symbol and orientation) can be padding that is ignored or used to store other information. The code might include CRC or other error correction information to account for scanning errors. In this way, it is possible to start with a unique 480-bit code including correction and then generate the representative visual encoding from the code. It should be appreciated that a wide range of encoding schemes are possible that map properties of visual indicia at various locations (and possibly various orientations) to a string of bits that can be used to look up identifying information for virtual content in a database.

Figure 2H:
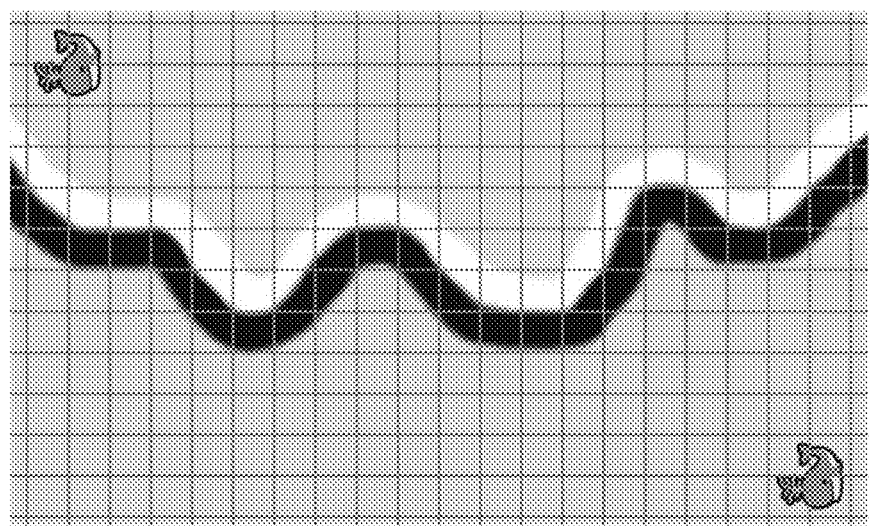
FIGS. 2F-H illustrate an example encoding using a filter applied to an image, in accordance with an embodiment.
Figure 2G:
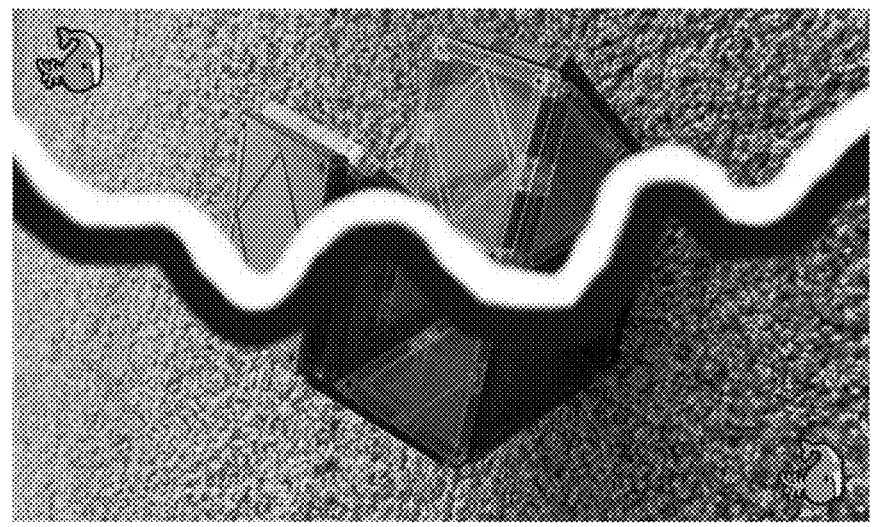
Figure 2F:
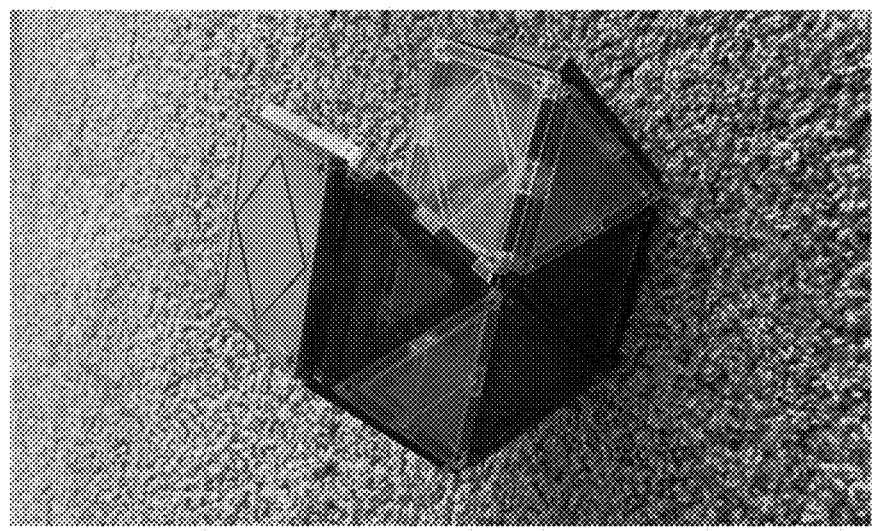

FIGS. 2F-H illustrate an example encoding where the visual indicia are generated by applying a filter to an image, according to one embodiment. FIG. 2F shows an example image to which the filter may be applied. In FIG. 2G, the filter has been applied, adding a static representation of a wave passing from one side of the image to the other. A symbol may be added at one or more predetermined locations in the image to register the filter (i.e., identify which filter has been applied). For example, in FIG. 2G, there is a whale emoji in the bottom-left and top-right corners indicating the water wave filter has been applied. This may make is easier during analysis to determine that an encoding has been applied that identifies supplemental content. Alternatively, the use of the filter may be detected by a machine-vison algorithm such as a machine-learning classifier that detects the applied wave (or other visual indicia that make up the encoding) directly.

FIG. 2H illustrates how this wave encodes a unique identifier. A grid superimposed over the image can again be used to define a set of positions at which the wave was added to the image. In one embodiment, a single cell in the grid in each row is selected that is most completely filled by the wave. Alternatively, the cell through which the high-contrast border between two parts of the graphics added by the filter (in this case, the line dividing the white and blue portions of the wave) may be identified. In the specific example of FIG. 2H, this would give, from top to bottom, the unique identifier {8, 7, 7, 7, 6, 5, 5, 6, 7, 7, 6, 5, 5, 5, 6, 8, 8, 7, 7, 8}. In some embodiments, the supplemental content identified by the unique identifier that is provided by scanning the static image includes may be a version of the image with the filter dynamically applied (e.g., in which the wave starts on one side of the image and passes across it). Additionally or alternatively, the additional content may include other virtual content that supplements the static image, such as music, a video clip from which the static image was captured (with or without a filter applied), or AR content that supplements the static image.

Figure 2I:
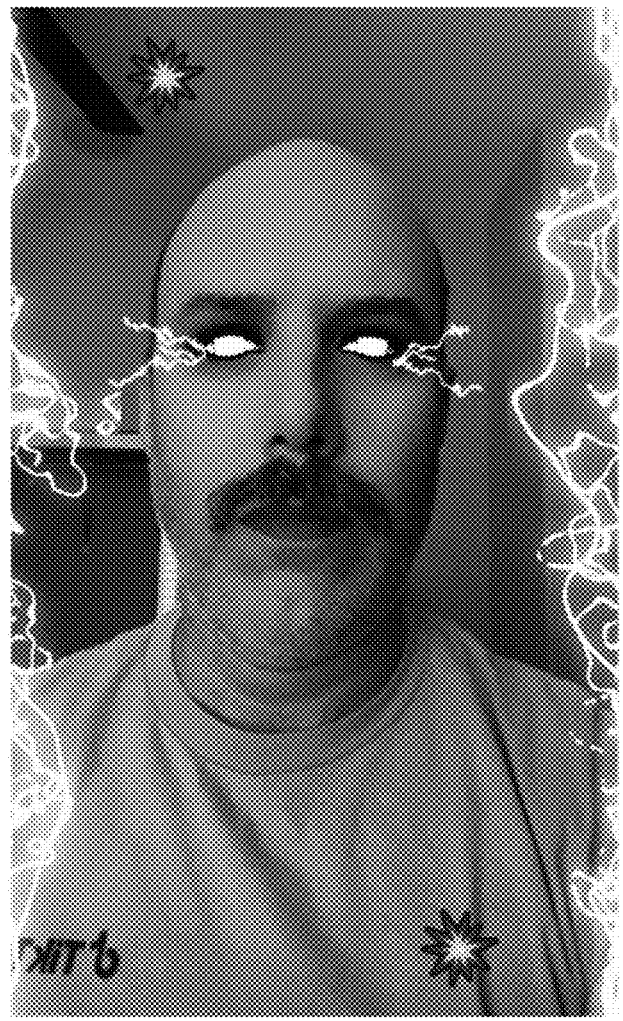
FIG. 2I illustrates another example encoding using a filter applied to an image, in accordance with an embodiment.

FIG. 2I illustrates another example encoding using a filter applied to an image, according to one embodiment. In the example shown, a pair of the explosion symbols are used for registration and the paths of the electricity along the edges of the image are used for the encoding. In one embodiment, a collection of earlier designed stamps of electricity are placed along the edges. Each side has a predetermined number of different regions (e.g., 8 regions) for a potential stamp with space in between them for easy distinction between regions. The entries and exits of the electricity patterns from the stamps are stored with the stamp and, at the time of creation, the gaps between the stamps are filled to connect each stamp with the stamps above and below to create a contiguous image. The particular combination of stamps and corresponding positions creates a large number of possible encodings. For example, with fourteen different recognizable stamps that are placeable at eight locations there are approximately 1.5 billion combinations.

In some embodiments, as shown in FIG. 2I, facial recognition may be used to find the eyes (or any other predetermined feature) in the image and draw a series of electric lines outward from the eyes. Depending on the count and position of those lines, more combinations can be added to the possible encodings, or the number of stamps/locations along the edges can be reduced while retaining the same number of potential encodings. It should be appreciated that other types of filter made up of combinations of recognizable stamps placed at specific locations may be used.

The embodiments described above with reference to FIGS. 2A-I generally applied rules-based analysis to determine the location of visual indicia in an image that encode a unique identifier of one or more pieces of associated virtual content. However, in some embodiments, a machine-learning classifier or genetic algorithm may be applied that takes the image (including the visual indicia) as input and outputs the corresponding decoded unique identifier. Such a classifier or algorithm may be trained by providing a set of labeled examples of images that are overlaid with the visual indicia corresponding each unique identifier that will be used, splitting the set into training and validation data, and applying any suitable training technique. In some embodiments, the labeled training data may be generated automatically using the rules-based approach described above. Using a machine-learning classifier or genetic algorithm may be more robust to deficiencies in images captured by a user device at run time, such as in scenarios where the lighting of the physical object is poor or the camera on the user device is low quality. These techniques may also be able to decode unique identifiers from images with denser information than is possible using the rules-based approach.

Example Processes

The steps of the various processes described below are illustrated from the perspective of various components of the networked computing environment 100 performing the processes. However, some or all of the steps may be performed by other entities or components. In addition, some embodiments may perform the steps in parallel, perform the steps in different orders, or perform different steps.

Figure 3:
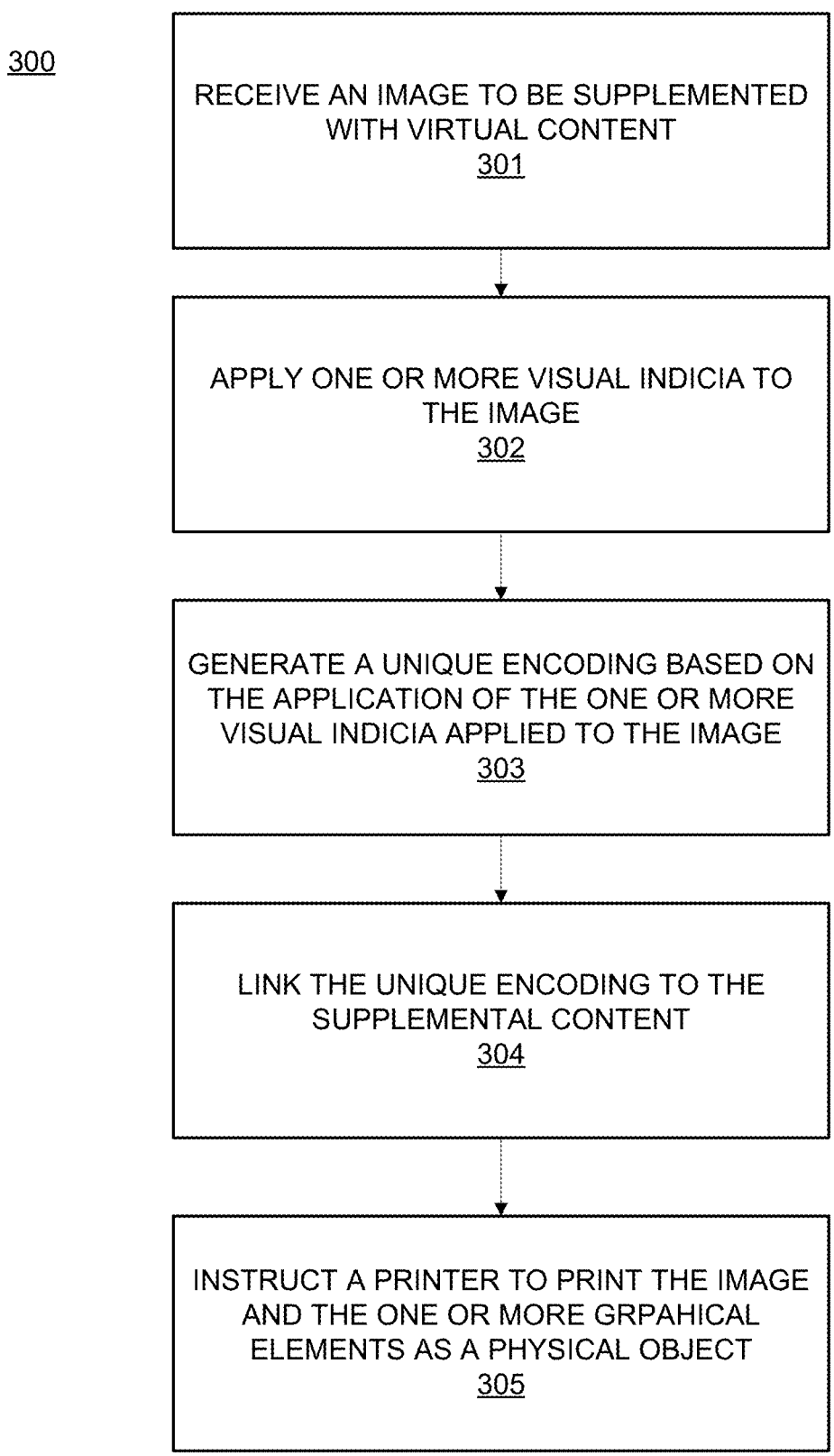
FIG. 3 is a flowchart of a method for augmenting content using printed encodings, in accordance with an embodiment.

FIG. 3 is a flowchart of a process 300 for augmenting content using printed encodings, in accordance with an embodiment. In the embodiment shown, the process 300 begins with the server 110 receiving 301 an image to be supplemented with virtual content. The server 110 applies 302 one or more visual indicia to the image. The server 110 generates 303 a unique encoding based on the application of the one or more visual indicia to the image. The server 110 may link 304 the unique encoding to the supplemental content, such as by storing the unique encoding generated from the visual indicia in a database in conjunction with a storage location where one or more files for providing the supplemental content are stored. For example, the one or more files may include one or more media files that are linked to a non-fungible token (NFT), AR content, video files, sounds files, and the like. The server 110 instructs 305 a printer to print the image overlaid with the one or more visual indicia as a physical object. In embodiments, when a camera view includes the one or more visual indicia, they may be analyzed to obtain the unique encoding and user device 101 may provide some or all of the supplemental content in conjunction with or instead of displaying the camera view that includes the physical object.

Figure 4:
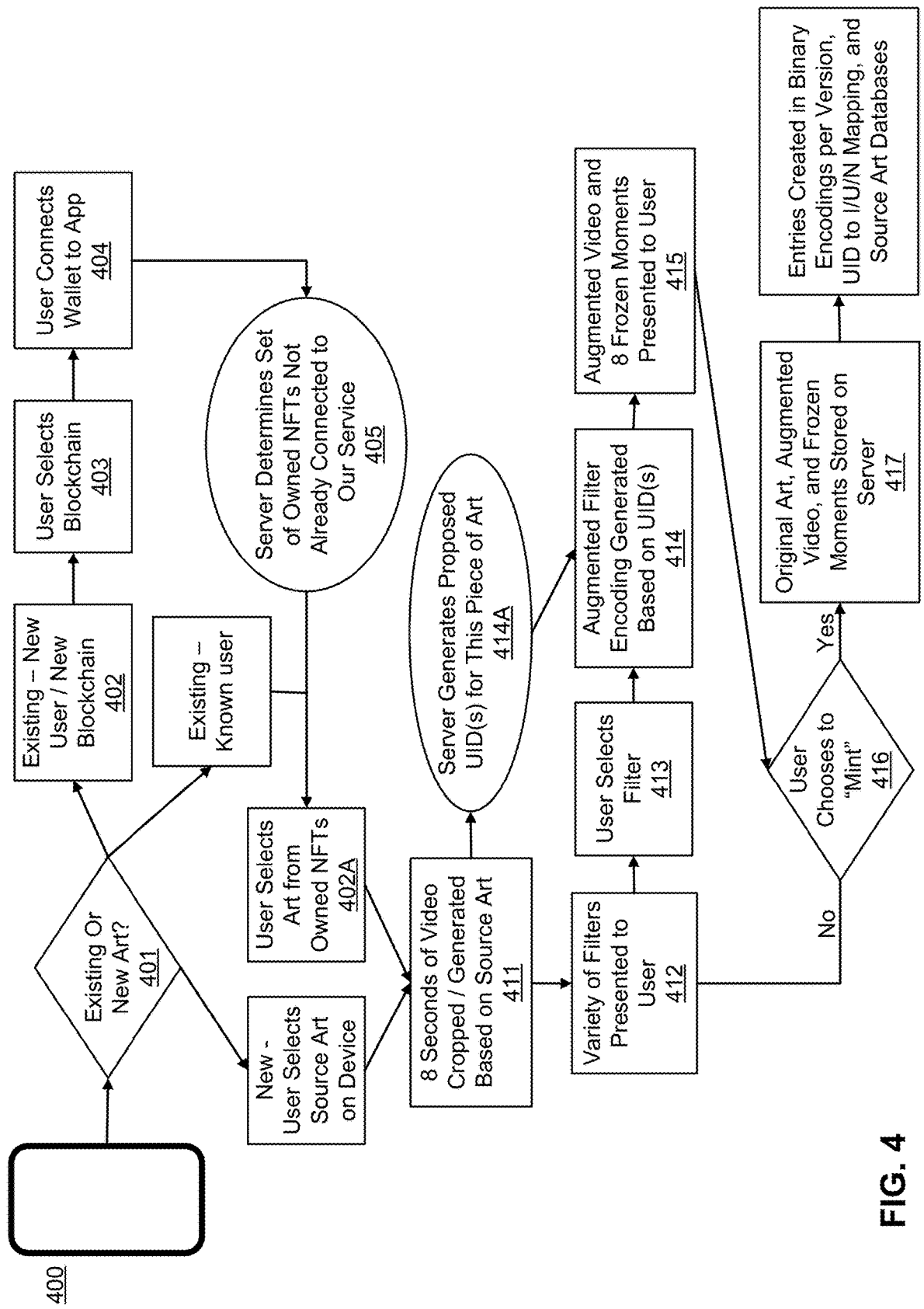
FIG. 4 is a flowchart of a generation process, in accordance with embodiments.

FIG. 4 is a flowchart of a generation process 400, in accordance with embodiments. The process 400 may begin with the server 110 receiving an image. For example, a user may upload an image to the system or may provide the storage location or web address of where the image is located/hosted. As another example, the user may upload a video and may identify a segment of the video from which an image frame may be selected from by the system. After receiving an image, in step 401, the server 110 determines if the image is existing or new art. For example, a prompt can be provided to the user asking if the image is new or existing. In another embodiment, the server 110 checks the image against a library of images to determine if the image is new or existing art. In another embodiment, the server 110 may recognize the art as already being augmented by these systems. In yet another embodiment, the user may begin by identifying an existing online resource by URL or by using a share function on their device 101 (e.g., from a social media post).

In step 402, if it is determined that the image is existing art, the server computer receives an indication that the user is a new user or that the art exists on a blockchain account not already associated with this user. The user may then link their existing wallet via step 403

In step 403, the user selects a blockchain. This may be done by providing a visual display of supported blockchains and prompting the user to select one. For example: Ethereum, Solana, Polygon, Tezos, Avalanche, etc. may be supported, depending on the specific implementation.

In step 404, the user selects a connection mechanism with which the server 110 can validate ownership of an existing NFT/blockchain resource. In one embodiment, the user selects a trusted third party (e.g., MetaMask) as their wallet provider and a third-party authentication page is launched where the user enters their MetaMask credentials and then authorizes MetaMask to provide the server computer with details of the users blockchain wallet(s). In another embodiment, the user chooses a standard cryptographic challenge-response linking: the server computer generates a cryptographic challenge and provides it to the user (often as a QR code); the user forwards the challenge to their blockchain wallet (often by reading the QR code with a device's camera) which responds and signs the challenge; the user then provides the signed response back to the server computer (another QR code) and ownership is verified. In another embodiment, the user identifies a supported application on their device 101 as the wallet provider. The server 11 may provide a cryptographic challenge and the user's device 101 may internally forwards the challenge to the supported application and provides the signed response back to the server 110.

In step 405, the server 110 discovers available NFTs owned by the user. In one example, the server computer may connect to a third-party API (e.g., OpenSea) and query the third party for a list of NFTs owned by the user. In another embodiment, the server may read cached copies of the blockchains directly, updating as necessary, searching for NFTs owned by the user's provided wallet addresses. The server then filters out NFTs that are already bound to the system.

In step 402A, the server 110 utilizes the list of owned NFTs already associated with the known user, updating the list as necessary.

In step 406, the device 101 presents the list of available NFTs to be "minted" within this system. In one embodiment, a list of names of NFTs and services is presented for selection. In another embodiment, a scrolling view of the media associated with each NFT is presented.

In step 410, if it is determined that the image comprises new art, the user selects source art from the user's device. This may be captured directly via camera or from a list of media files stored on the device. In another embodiment the user chooses a media hosting service and selects from their available media within those services.

In step 411, a canonical version of the media of predetermined length (e.g., eight seconds) is selected or generated. In one embodiment, a longer video is trimmed to clip of the predetermined length. In another, a still image is expanded into clip of the predetermined length by applying one or more visual effects such as pan and scan. In yet another embodiment, a generative algorithm is watched and scrubbed forward in time until a good moment is viewed and a predetermined amount of content on either side of that selected moment (e.g., four seconds from each side of the selected moment) is combined to form the clip.

In step 412, the user is presented with a variety of filters, shaders, and (as mentioned above) to select between for augmenting their media clip. In one embodiment, a set of categories (e.g., frame, distortion, filter, color-changes) are presented to the user. In another embodiment, a rotating display of potential options display sequentially to the user showing select specific filters. In another embodiment, an eternal scrolling list of possibilities is presented to the user, where selecting or dragging one to the side presents further customization options related to the chosen presentation.

In step 413, the user selects and customizes their filter. In one embodiment, a frame is selected and a style chosen to surround the media. In another embodiment, some emoji stickers are selected to be placed on top of the image. In another embodiment, splashing water and beach decorations are selected to filter the image.

In step 414A, the server 110 generates a unique identifier (UID) for this creation and validates it is unused and differentiable from other UIDs and provides that identifier to the user's device 101. In one embodiment, a hex string of 32 characters is selected and provided. In another embodiment, 3-6 regions of a grid are selected and the corresponding graphics codes for each chosen region are selected: this might mean codes 0, 4, and 12 are selected for a region and might correspond to a smiley-face, microphone, and star in one filter while corresponding to a soccer ball, goal, and grass in another filter. In another embodiment, 3 selections of 64-bit UIDs are provided to be chosen between by the user.

In step 414, the user's device collects the unique identifier (UID) and combines with the chosen filter encoding to create the augmented video. In one embodiment, a binary encoding of the UID is converted to a pattern of raised and lowered beads around the frame. Each bead representing a 1 if raised and a 0 if lowered. In another embodiment, the UID determines the placement and number of a series of white and black lines across the exterior frame. In another embodiment, the swirling pattern of water is positioned and sized based on different blocks within the UID and timed according to another block within it. In another embodiment, shaped regions (e.g., rectangle, star, or triangle) of the video are converted to grayscale, the shapes moving, appearing, rotating, and disappearing according to blocks of data within the UID. In another embodiment, emoji stickers are placed within a grid in different groupings and sets according to the instructions provided by the server computer. Error correction techniques may be employed to increase the size of the UID to something including the original unique key and error correction codes in order to provide redundancy within the filter-key. In one embodiment, a set of parity bits are generated between the first half and second half of the UID, increasing the size of the filter-key by half and providing the filter-key to the user's device.

In step 415, the user is presented with the combination of the UID/filter-key encoding filter and the video. The user may be given a few final possibilities or the one result of their selections. The user may choose to approve and "mint" the augmented presentation (or one of the possible presentations) or to cancel and return to filter selection in step 412. In one embodiment, some virtual currency may be required to complete the minting process. In another embodiment, the user may need to authorize payment of fiat currency or blockchain currency toward the minting. In another embodiment, the user has a subscription that allows so many mintings per month.

In step 416, the user's device 101 and server 110 agree to finalize the minting process. The original art, augment video, and frozen moment are all agreed upon between the user device and the server. The proper encoding of UID is verified by the server 110 and the user's device 101 locks the final presentation In step 417 the server 110 registers the UID and visual presentation with the recognition engine and stores them in the associated database(s). In one embodiment, the UID is stored in a version table with other UIDs encoded using the same version of the recognition engine. In another embodiment, the position and rotation of emoji stickers is registered with the recognition engine and stored. In another embodiment, the final encoded frame is used as a single image target within a database of image targets for the chosen frame-type. In another embodiment, the binary code and frame type are registered with the recognition engine such that the recognition engine is capable of reading the binary code pattern directly from the frame.

Figure 5:
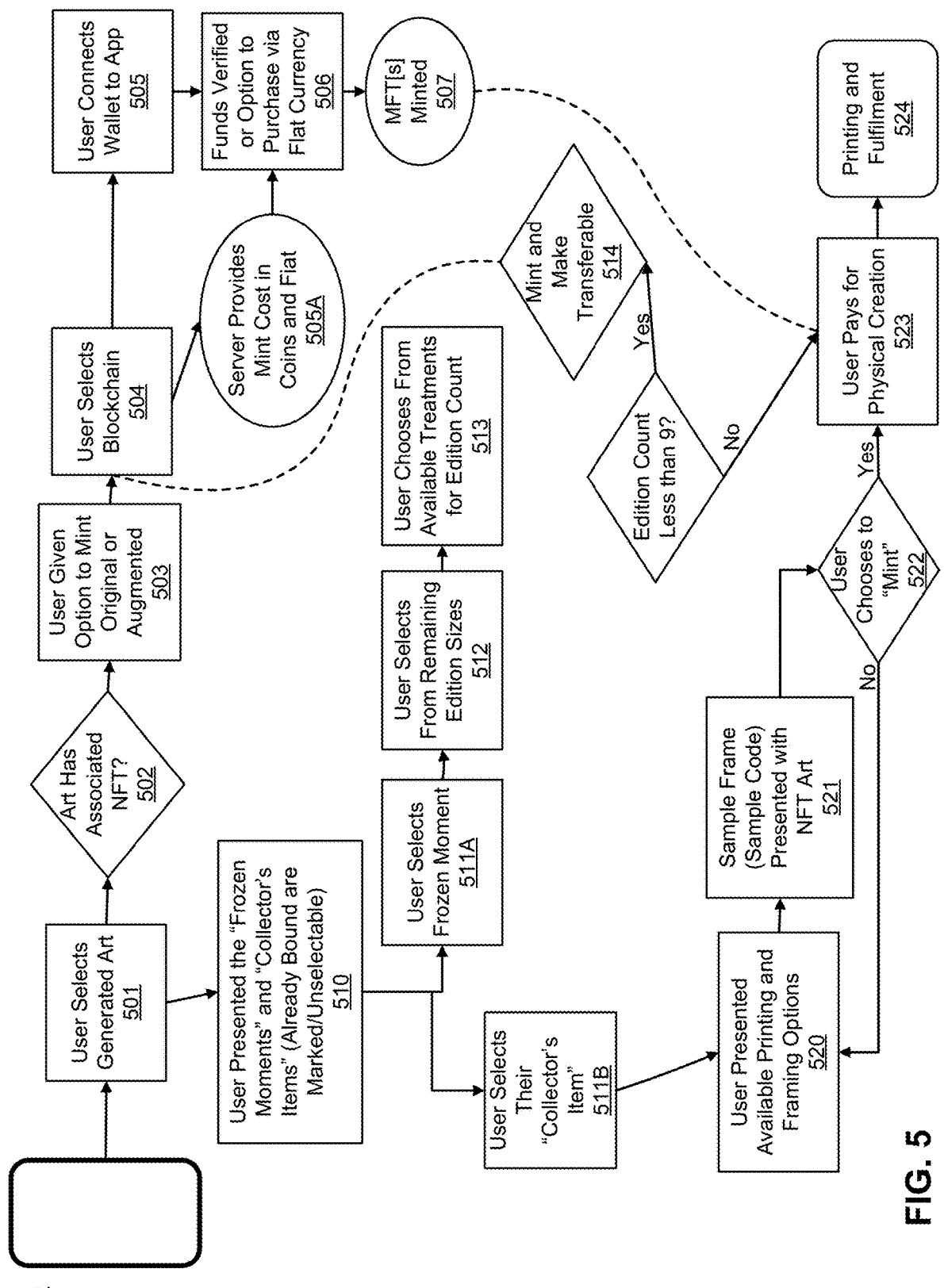
FIG. 5 is a flowchart of a binding process, in accordance with an embodiment.

FIG. 5 is a flowchart of a binding process 500, in accordance with embodiments. In step 501, the user selects a piece of generated art previously created in various embodiments via the generation process described in FIG. 4. This art may or may not have already been associated with an NFT on a blockchain.

In step 502, the server 110 determines if the art has an associated NFT. This will be recognized either by a previous binding of the art to a blockchain item done within the application, or the server 110 may scan blockchains to find reference to the piece of art that is already existing. If no blockchain reference can be found, the user is given an option to mint the original image and/or the augmented image generated by the application (containing UID tracing information). The other option may be selected by repeating this process or both options may be fulfilled at the same time depending on the implementation.

In step 504, the user selects between various blockchains on which the user may mint their NFT. This may be a visual display of supported blockchains. For example: Ethereum, Solana, Polygon, Tezos, Avalanche, etc. for the user to select between.

In step 505, the user connects their wallet to the application, if this process either a) has not been completed, or b) the user needs to connect an additional wallet. In step 505A, the server 110 inspects the selected blockchain to determine an estimate for the costs associated with writing/minting the NFT on the given blockchain. Such fees include gas fees, transfer costs, costs of per-byte data on the chain, any additional contracts required to be written to the chain, fees associated with our servers, etc. After the cost in on-chain coins is determined, an exchange is queried to determine an exchange rate between the on-chain currency and the user's local fiat currency (fiat currency examples include USD, GBP, Yen, etc.).

In step 506, the user is presented the option to use on-chain coins (if available within the user's wallet) or the computed costs in their local fiat currency. If fiat is selected, a payment provide may be used to transfer fiat funds. If on-chain currency is selected, then a transfer must be initiated via approval in the user's supported wallet or a target address generated and given to the user to provide currency independently. In the latter case, the transaction may be stored and held within the server 110 until the currency is received.

In step 507, once funds have been verified to be supplied by the user, the NFT and any associated contract/transfer/etc. are written to the blockchain in a transaction appearing on that chain's public ledger. Thus "minting" the generated (either original or augmented) art as a public-record NFT.

In step 510, the user is presented with a choice of available frozen moments and collector's items. For example, a user account may give that user eight frozen moments and a specialty "1 of 1" collector's item for any given item of content and may be presented with an indication of which of these are still available to be bound to physical art. Some of these may have already been used to produce physical goods previously. Not all of the available slots need be bound at one time.

In step 511A, the user selects to use a standard frozen moment piece of generated art as their intent to bind to physical media. This is art augmented in the process described above.

In step 512, the user chooses an edition size for this particular frozen moment. Edition sizes may be as small as one or two or as large as one thousand or more with choices in between available. This step may present the user with a hint about the kinds of items that can be produced depending on the size of the edition.

In step 513, the user chooses from available treatments for the edition count. Treatments may include, for example, printed playing/collectible cards, tote bags, t-shirts, event tickets, gaming chips, posters, bracelets, book covers, etc.

In step 514, if the edition is small enough and on supported media, the user may choose to make the physical items transferable in blockchain ownership via the physical media itself. In this case, the user needs to pay any associated fees (in advance) with the primed number of transfers encoded onto the physical media. One example of this would include trading cards with four "scratchers" on the back of the card. Each "scratcher" section has a printed visual code obstructed by scratch-off foil printing to obscure the codes. As such the physical item can be shown to have remaining transfers available (unrevealed scratch-off sections). In this case, the items are minted onto the chain stating that they may be transferred up to four times needing only the authorization of the relevant servers/wallets. The user creating this edition prepays to cover the costs of the four future transfers for each physical item being generated (e.g., for eight items, eight mintings and thirty-two potential transfers).

Step 515 involves the user making the affirmative choice to encode transfer information into the edition. They return to the flow started by step 504 to choose a blockchain and secure funding for the process.

In step 511B, the user selects their intent to bind their "1 of 1" to physical media. This being a single physical artifact representing the original and unadorned NFT/frozen moment as a personal showpiece.

In step 520, the user is presented with a variety of available printing and framing options. Such options may include printing the image to metal backing, onto canvas media, a poster, a multi-piece mural, etc. or exclude the art print for the user to supply themselves.

In step 521, the user selects the unique frame from a variety of options and treatments. Potential varieties and frame encodings being described above. Here the user is shown a sample frame with their art inside to get the sense of the final look once received. In step 522, the user confirms their intent to "mint" the art onto physical media and the user is reminded that this is a one-time process that is complete and final once chosen. In step 523, the user secures payment for the cost of physical goods for the frozen moment or "1 of 1" that they have selected to create.

In step 524, the selected physical goods are printed or otherwise created and provided to the user. In one embodiment, specifications for the physical goods are automatically provided to a printer (e.g., printer 120) which prints the goods and then they are shipped to the user (e.g., at an address associated with the user profile or provided during the ordering process). Alternatively, instructions (e.g., a graphics file) may be provided to the user for the user to use themselves to print the physical item. Various options for step 524 according to various embodiments are on in FIG. 6.

Figure 6:
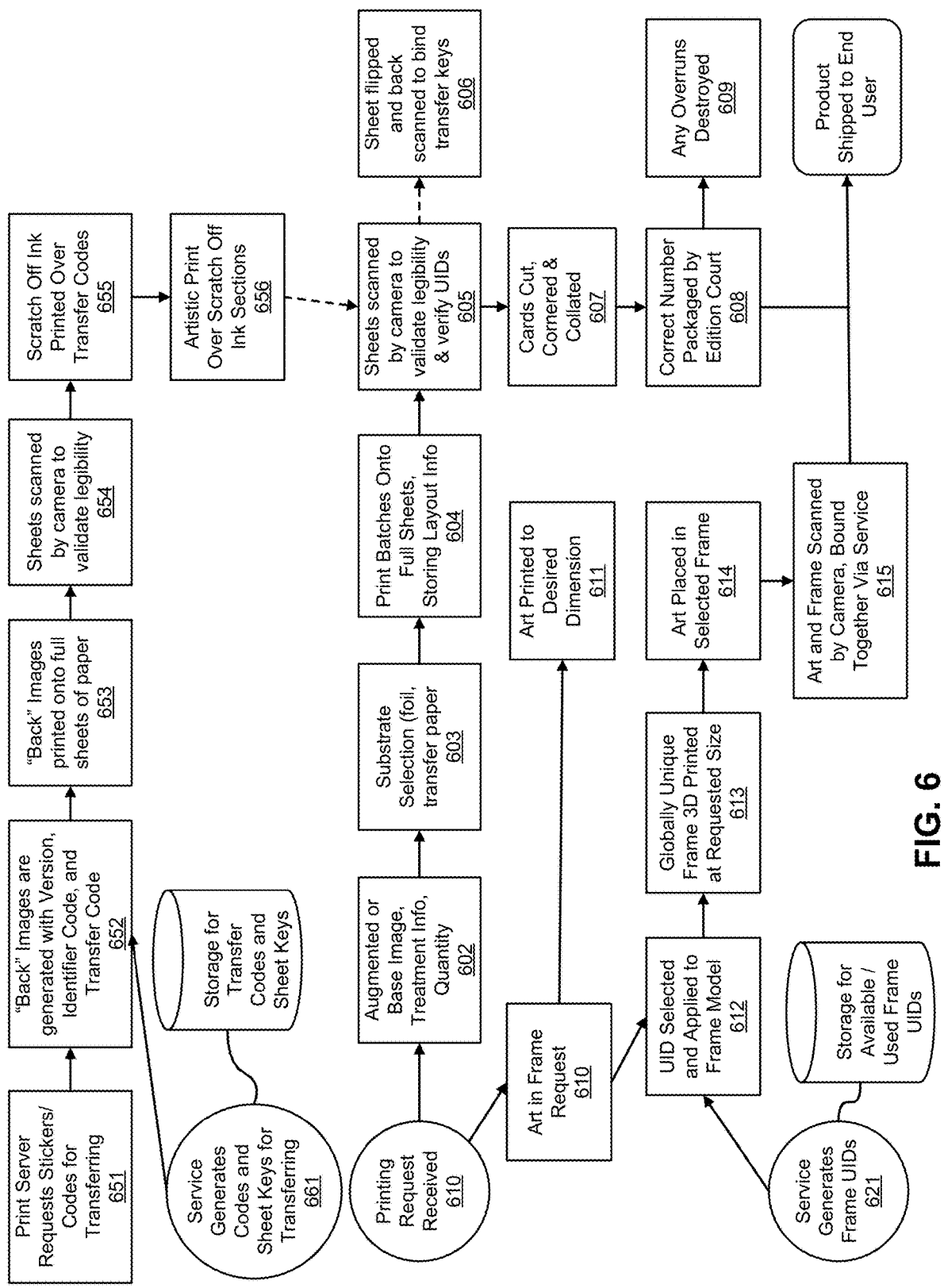
FIG. 6 is a flowchart of a printing process, in accordance with an embodiment.

FIG. 6 is a flowchart of a printing process, in accordance with embodiments. In step 601, the printing system 120 receives a request for physical production, either of an augmented base image (602) or for a frame to be generated (610). In step 602, the system receives the recognizable image, any treatment info (foiling, garnishings, item type, etc.), and a quantity for creation. In step 603, a substrate is chosen, which may be cotton material for a t-shirt or a canvas print, card paper for trading cards, transfer paper, poster-board, metal-board, etc. In step 604, images are potentially collated and printed (for example onto 64 card sheets), noting layout information and any other tracking information.

In step 605, finished product is placed in front of a camera of quality akin to cell phone technology. A computer attached to that camera reads an image or series of images from a video feed of the finished product and validates legibility/recognizability against the database of recognizable images (e.g., by performing the process 700 described below with reference to FIG. 7).

In step 607, any finishing is performed on the designated items. In one case, cards are cut from a larger sheet, cornered, and collated, and grouped into orders. In another case, a canvas is stretched onto a frame. In a further case, t-shirts are washed and placed into bags. It should be appreciated that a wide range of finishing tasks may be performed based on the specific nature of the physical product and the requirements of the user.

In step 608, the selected number of items in the edition(s) are counted, packaged, and prepared for shipment. In step 609, any overruns (items created beyond the desired count) may be destroyed. In step 610, the system receives a request to create a frame and (possibly) its corresponding art. This may include, for example, the size and shape of frame desired, the style of frame, material, and any customizable portions. In step 611, the unique art may be printed at the desired dimension with any desired treatments on whatever material is supported/desired.

In step 612, a UID is received from a service (step 621) that can generate/retrieve unique identifiers at desired bit-lengths. The given UID is then applied to the 3-dimensional frame model and a final form is sent to a 3d printer. In step 613, the globally unique frame is 3D printed at the desired size with any specific customizations or treatments desired. In step 614, the art printed in step 611 may be placed within the printed frame. In step 615, the art and frame are scanned by a camera. A computer runs a recognition algorithm (e.g., as described below with reference to FIG. 7) to verify legibility of the frame and record the art and frame binding in the server 110. If the art and frame do not register correctly with the recognition system, the process may return to step 612 and make another attempt. After a specified number of attempts, a failure condition may be triggered to initiate human intervention to evaluate the problem.

Figure 7:
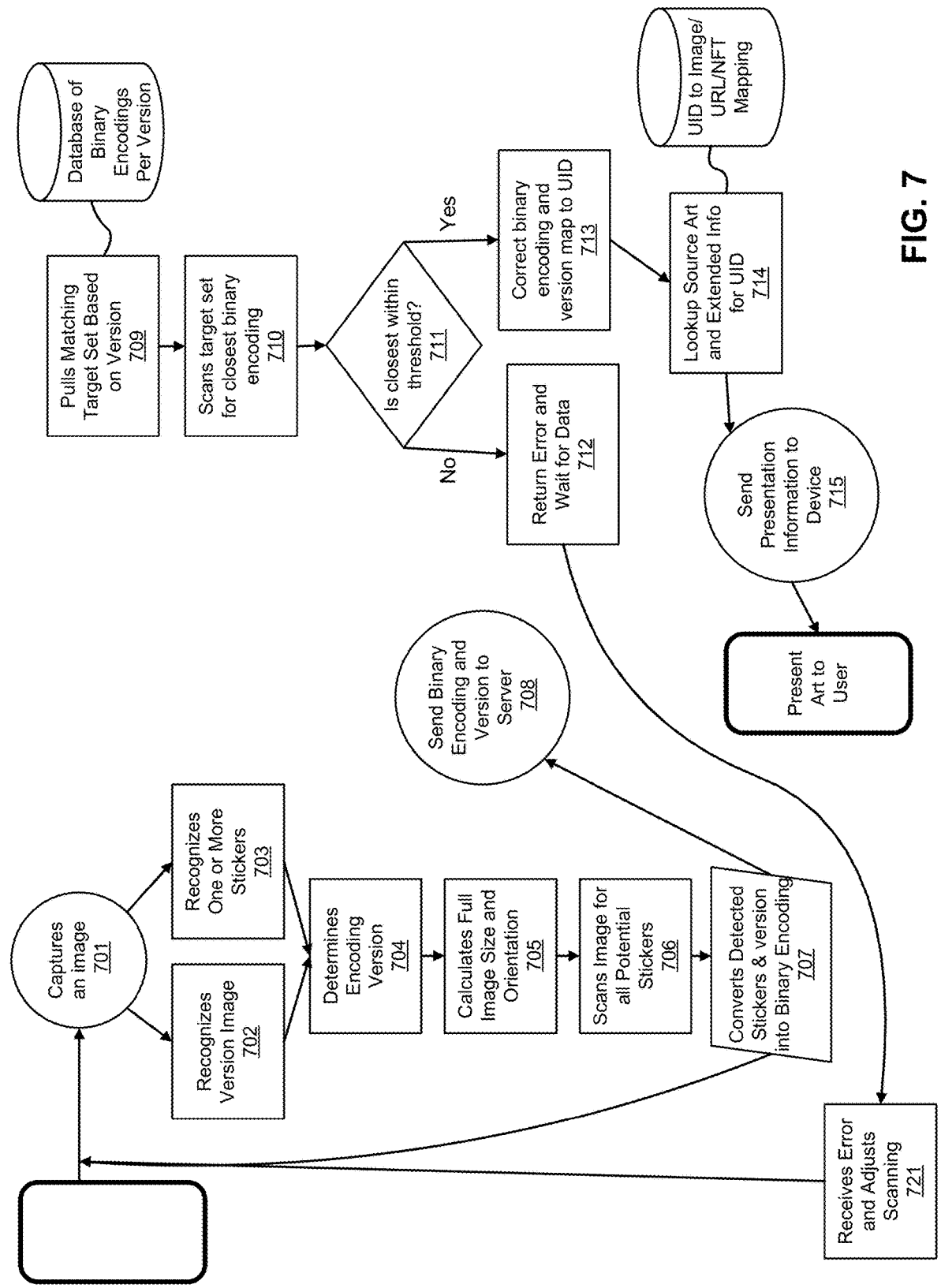
FIG. 7 is a flowchart of a scanning process, in accordance with an embodiment.

FIG. 7 is a flowchart of a scanning process, in accordance with embodiments. In step 701, a camera, e.g., on a user device 101, captures an image that potentially includes a representation of a frozen moment. In step 702, a special version image is detected within the image frame via target image recognition. In step 703, the system recognizes one or more visual indicia (e.g., stickers or emoji) used in generation within the image frame.

In step 704, the system uses the version image, the visual indicia within the image, or both to determine the algorithm version currently being used. In step 705, the system uses the version information along with the size and shape of recognized images to calculate the full image size and orientation. That image is then stretched, skewed, and gain is applied, to form a canonically shaped and sized reconstruction of the frozen moment detected within the image sensor.

In step 706, the system scans the canonically transformed version for all potential visual indicia (e.g., stickers or emoji) that are expected within the original printing. More fine grained detection across a wider range of adornments are used in this step to identify the presence of relevant visual indicia. In step 707, the system converts the combination of all recognized visual indicia and version information to form an encoding (e.g., a binary or hex encoding).

In step 708, the system sends the encoding and version string to the server 110. In step 709, the server 110 pulls the matching target set out of a database store of potential UIDs within the version set. In step 710, the system scans the target set to find the closest binary encoding within the set. In step 711, the system determines whether the closest binary encoding is within a predetermined difference threshold for the version to prevent a bad read from potentially finding a random or unintended UID. In step 712, the system returns an error code and waits for new data from the device 101 if the closest binary encoding is not within the threshold. The device 101 receives this request in step 721 and begins a fresh scan to find a frozen moment.

In step 713, the matching UID is determined to be a valid error correction and used to retrieve more information about the frozen moment. In step 714, the system looks up the original source art and all extended information for that recognized frozen moment created in the generation process. In step 715, the system sends any/all presentation information to the user's device 101 for presentation in conjunction with the scanned physical object.

Figure 8:
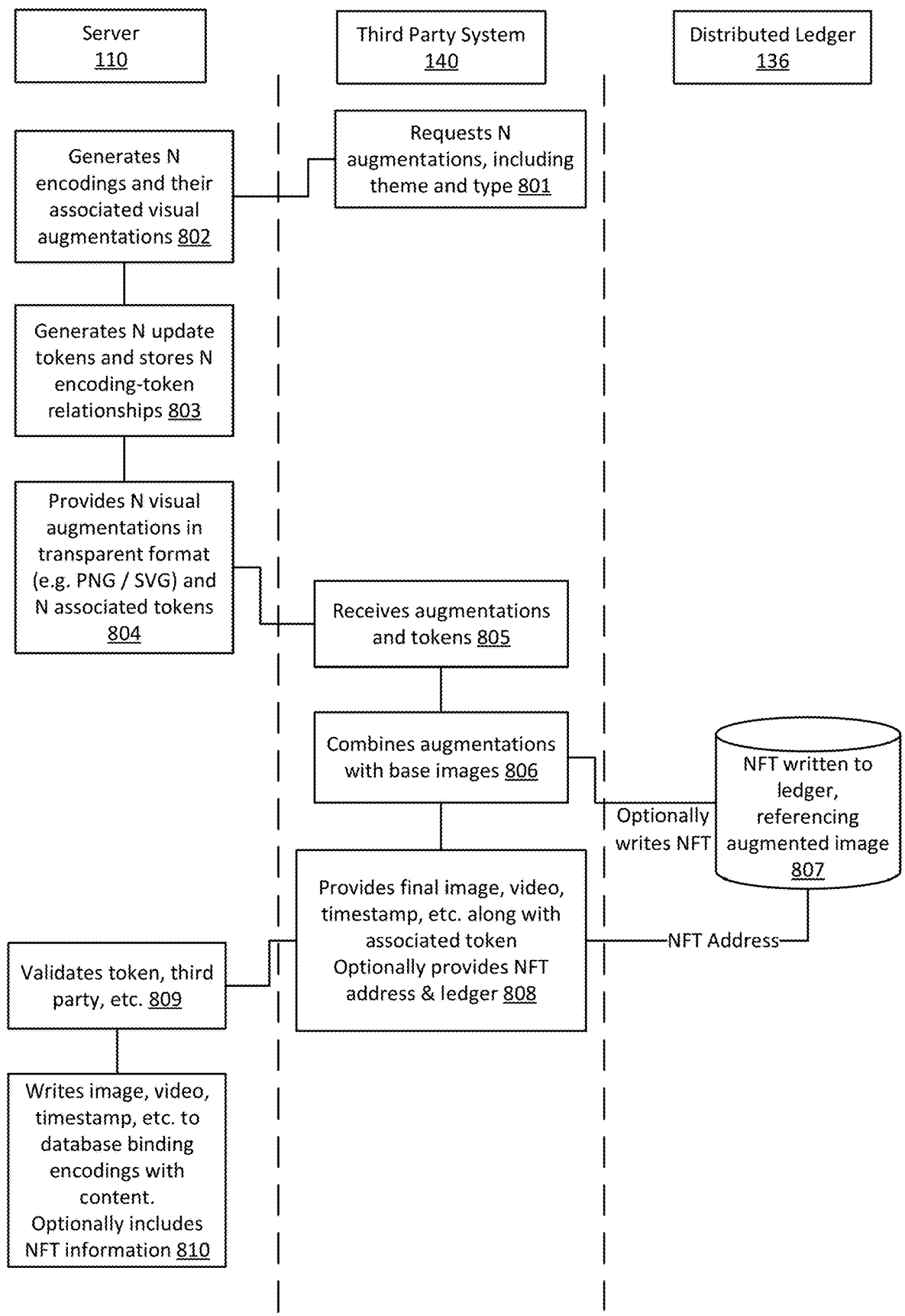
FIG. 8 is a flowchart of a process for providing and managing augmentations to a third party for combination with a base image, in accordance with an embodiment.

FIG. 8 illustrates an example process for providing and managing augmentations to a third party for combination with a base image, according to an embodiment. In the embodiment shown, a third-party system 140 requests 801 a specified number of augmentations from the server 110. The request may identify a theme and type of augmentation. In response, the server 110 generates 802 the requested number of encodings along with corresponding visual augmentations. The server 110 also generates 803 an update token for each requested augmentation and stores the resulting encoding-token relationships. The server 110 provides 804 the visual augmentations and corresponding tokens to the third-party system 140. The visual augmentations may be in a transparent format such as PNG or SVG files.

The third-party system 140 receives 805 the augmentations and corresponding tokens and combines 806 the augmentations with base images. In some embodiments, the third-party system 140 may write 807 a NFT to a distributed ledger 136. The NFT may include a reference to the augmented image. The third-party system 140 provides 808 the augmented image along with the associated token and any associated video, hologram, or timestamps etc. to the server 110. If an NFT was created, the third-party system 140 may also provide 808 the address of the NFT on the distributed ledger 136 to the server 110.

The server 110 validates 809 the received token (e.g., to confirm that the third party is authorized to use the system). Assuming the token is successfully validated, the server 110 writes 810 the image, video, or hologram etc. along with any associated timestamps to its database. Thus, the encodings become bound to the associated content. The server 110 may also include NFT information in the database in cases where an NFT was created to bind the NFT with the content and encodings as well.

Figure 9:
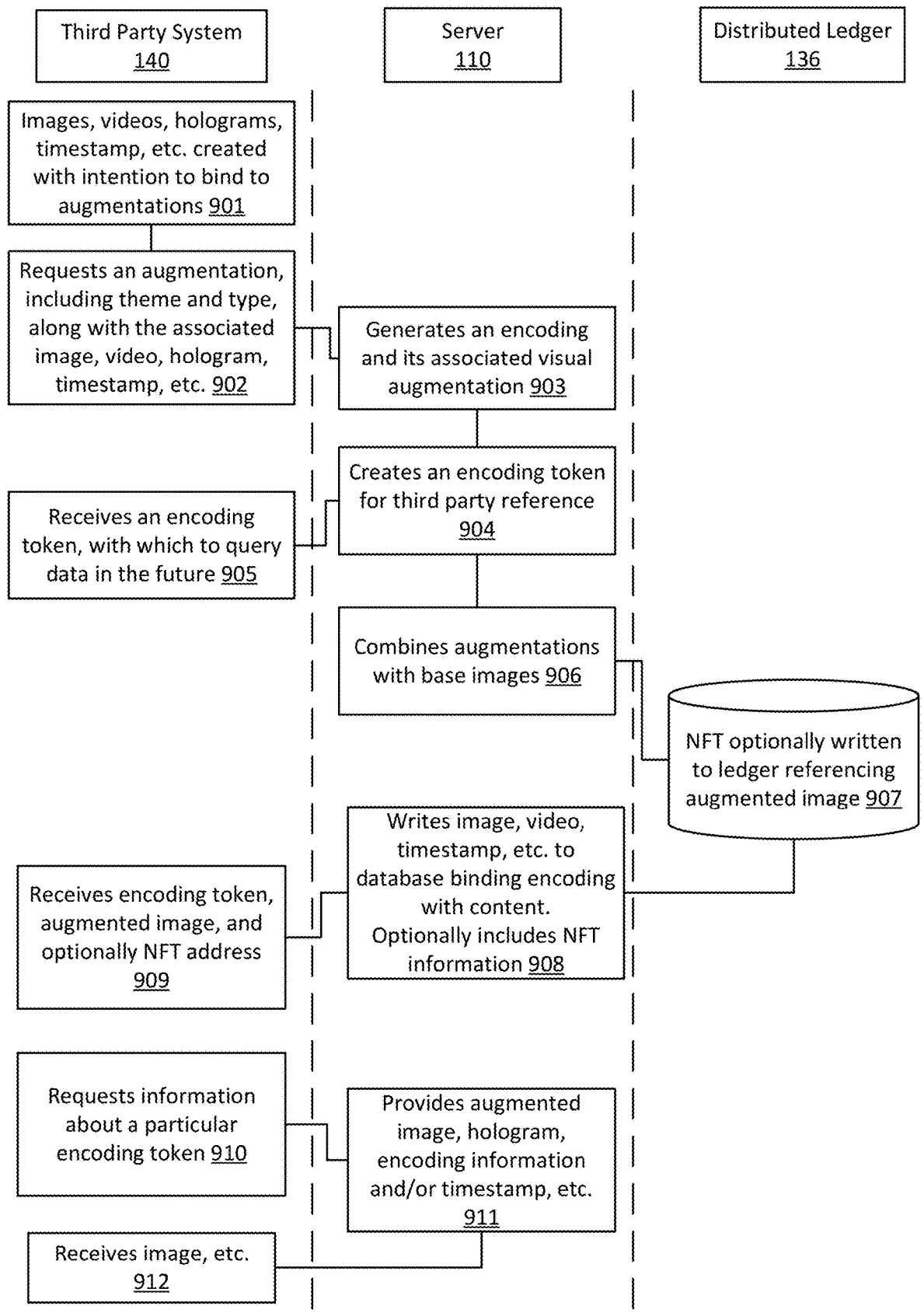
FIG. 9 is a flowchart of a process for augmenting content provided by a third party, in accordance with an embodiment.

FIG. 9 illustrates an example process for augmenting content provided by a third party, in accordance with an embodiment. In the embodiment shown, a third-party system creates 901 content such as images, videos, or holograms, etc., along with any relevant timestamps, to be bound to augmentations. The third-party system 140 requests 902 an augmentation from the server 110. The request may identify a theme and type of augmentation and include information describing the content to be augmented or the content itself.

The server 110 generates 903 an encoding and a corresponding visual augmentation. The server 110 also create 904 an encoding token for reference by the third party in making future queries for the encoding and visual augmentations associated with the content. The third-party system 140 receives 905 the encoding token from the server 110, which can store it for later use.

The server 110 combines 906 the augmentations with base images. In some embodiments, the server 110 writes 907 an NFT to a distributed ledger 136. The NFT includes a reference to the augmented image. The server 110 also writes 908 the image, video, hologram, and timestamp, etc. to a database, binding the encoding to the content. In cases where an NFT was created, an identifier of the NFT way also be added to the database. The third-party system 140 receives 909 the encoding token, augmented image, and NFT address/identifier (if an NFT was created) from the server 110.

At a later time, the third-party system 140 may request 910 information about a particular encoding token from the server 110. In response, the server 110 uses the token to query its database and provides 911 the augmented image, video, or hologram, etc., along with any relevant timestamps and encoding information. The third-party system 140 receives 912 this augmented content from the sever 110 and may present it to a user in an appropriate way.

Computing System Architecture

Figure 10:
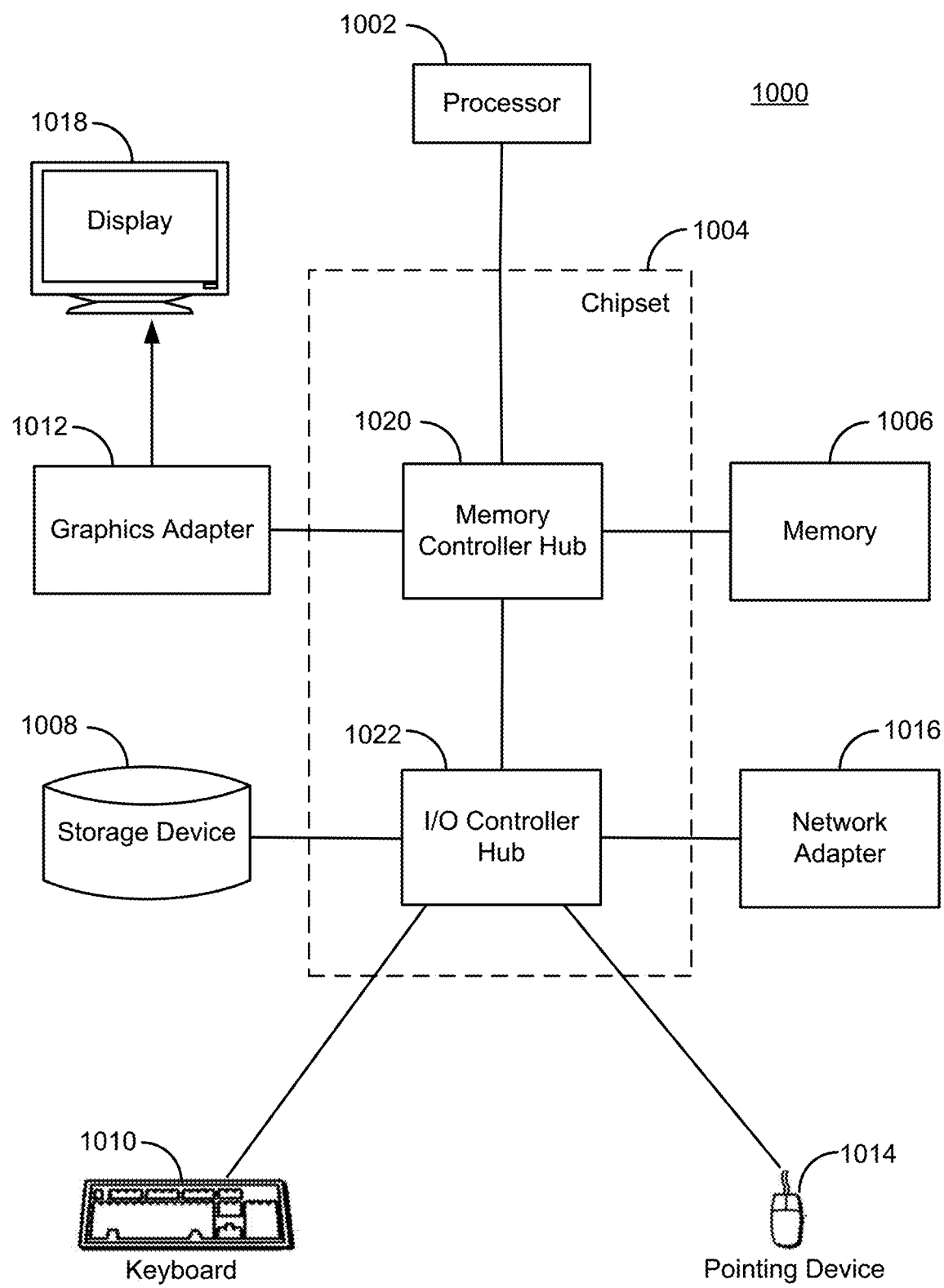
FIG. 10 is a block diagram illustrating an example of a computer suitable for use in the networked computing environment of FIG. 1, according to one embodiment.

FIG. 10 is a block diagram of an example computer 1000 suitable for use in the networked computing environment 100 of FIG. 1. The example computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

In the embodiment shown in FIG. 10, the storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, touchscreen, or other type of pointing device, and may be used in combination with the keyboard 1010 (which may be an on-screen keyboard) to input data into the computer system 1000. The graphics adapter 1012 displays images and other information on the display 1018. The network adapter 1016 couples the computer system 1000 to one or more computer networks, such as network 130.

The types of computers used by the entities of FIG. 1 can vary depending upon the embodiment and the processing power required by the entity. For example, the server 110 might include multiple blade servers working together to provide the functionality described while a user device 101 might be a smartphone. Furthermore, the computers can lack some of the components described above, such as keyboards 1010, graphics adapters 1012, and displays 1018.

ADDITIONAL CONSIDERATIONS

Embodiments described above may provide several technical advantages. By generating an encoding based on graphical elements applied to an image, the encoding can be printed in a visually appealing manner that is unobtrusive to the underlying image. By mapping the encoding to an augmented reality effect and the location of media files linked to an NFT, authenticity of a print can be visually verified in an interactive manner. Additionally, the systems and methods described herein allow content creators to mine additional value from user-generated content in an efficient, low-friction process.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. For example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:
  receiving, by a processor, an input image having image content;
  projecting a grid onto the input image, the grid comprising a plurality of cells with each cell having a corresponding position relative to the image content;
  selecting a subset of the plurality of cells to include visual indicia, the visual indicia not being part of the image content from the input image;
  applying, by the processor, the visual indicia to the input image, the visual indicia for each cell of the subset of cells being overlaid on the image content at the corresponding position relative to the image content to create a composite image including the image content from the input image overlaid with the visual indicia at positions relative to the image content;
  generating, by the processor, an encoding based on the positions of the visual indicia relative to the image content;
  causing, by the processor, the encoding to be linked to supplemental virtual content associated with the input image; and
  instructing, by the processor, a printer to print the composite image as a physical object, wherein recognizing, in a camera view of a device, the encoding based on the positions of the visual indicia relative to the image content on the physical object causes presentation of the supplemental virtual content by the device.

2. The computer-implemented method of claim 1, wherein the visual indicia comprise a configuration of markings on a border of the composite image.

3. The computer-implemented method of claim 2, wherein the markings comprise one or more first marks representing ones and one or more second marks representing zeroes, and the encoding is a binary code obtained by reading the markings in an order defined by the positions of the markings on the image border.

4. The computer-implemented method of claim 1, wherein the visual indicia comprise an image filter, and the encoding is determined from positions of elements of the image filter in the grid projected on the input image.

5. The computer-implemented method of claim 1, wherein the visual indicia comprise a set of emoji, and the encoding is determined from which emoji are included in the set and positions of the emoji in the grid projected on the input image.

6. The computer-implemented method of claim 5, wherein the encoding is further determined by orientations of the emoji relative to the image content.

7. The computer-implemented method of claim 1, wherein the supplemental virtual content is linked to a non-fungible token (NFT).

8. The computer-implemented method of claim 1, wherein the supplemental virtual content is a video and the input image is a frame of the video.

9. The computer-implemented method of claim 8, wherein at least a portion of the video file is played overlaying the composite image on the physical object in the camera view.

10. The computer-implemented method of claim 1, wherein the physical object is one or more of: a playing card, a holiday card, a piece of art, or a limited-edition trading card.

11. A computer-implemented method comprising:
receiving a composite image that depicts a physical object, the physical object including image content and visual indicia that represent an encoding that identifies supplemental virtual content, wherein positions of the visual indicia were determined by:
obtaining an input image including the image content;
projecting a grid onto the input image, the grid comprising a plurality of cells with each cell having a corresponding position relative to the image content;
selecting a subset of the plurality of cells to include the visual indicia, the visual indicia not being part of the image content from the input image;
applying the visual indicia to the input image, the visual indicia for each cell of the subset of cells being overlaid on the image content at the corresponding position relative to the image content to create the composite image;
determining the encoding based on positions of the visual indicia relative to the image content;
obtaining the supplemental virtual content using the encoding; and
presenting the supplemental virtual content in association with the physical object.

12. The computer-implemented method of claim 11, wherein the visual indicia comprise a configuration of markings on a border added to the image content.

13. The computer-implemented method of claim 12, wherein the markings comprise one or more first marks representing ones and one or more second marks representing zeroes, and the encoding is a binary code obtained by reading the markings in an order defined by the positions of the markings on the image border.

14. The computer-implemented method of claim 11, wherein the visual indicia comprise an image filter, and the encoding is determined from positions of elements of the image filter in the grid projected on the input image.

15. The computer-implemented method of claim 11, wherein the visual indicia comprise a set of emoji, and the encoding is determined from which emoji are included in the set and positions of the emoji in the grid projected on the input image.

16. The computer-implemented method of claim 15, wherein the encoding is further determined by orientations of the emoji relative to the image content.

17. The computer-implemented method of claim 11, wherein the supplemental virtual content is linked to a non-fungible token (NFT).

18. The computer-implemented method of claim 11, wherein the supplemental virtual content is a video and the input image is a frame of the video, and presenting the supplemental virtual content comprises playing at least a portion of the video file overlaying a view of the physical object in a camera view.

19. The computer-implemented method of claim 1, wherein determining the encoding comprises applying a machine-learning classifier or genetic algorithm to the image, the machine-learning classifier or genetic algorithm having been trained using training data that was automatically generated using a rules-based approach on other images depicting visual indicia that represent encodings that identify additional supplemental virtual content.

20. A non-transitory computer-readable storage medium comprising stored instructions that, when executed by a computing system, cause the computing system to perform operations including:
receiving a composite image that depicts a physical object, the physical object including image content and visual indicia that represent an encoding that identifies supplemental virtual content, wherein positions of the visual indicia were determined by:
obtaining an input image including the image content;
projecting a grid onto the input image, the grid comprising a plurality of cells with each cell having a corresponding position relative to the image content;
selecting a subset of the plurality of cells to include the visual indicia, the visual indicia not being part of the image content from the input image;
applying the visual indicia to the input image, the visual indicia for each cell of the subset of cells being overlaid on the image content at the corresponding position relative to the image content to create the composite image;
determining the encoding based on positions of the visual indicia relative to the image content;
obtaining the supplemental virtual content using the encoding; and
presenting the supplemental virtual content in association with the physical object.

* * * * *